(12) United States Patent
Grigorovitch et al.

(10) Patent No.: US 10,162,805 B2
(45) Date of Patent: *Dec. 25, 2018

(54) APPLICATION PROGRAMMING INTERFACES FOR CONTENT CURATION

(71) Applicant: Microsoft Technology Licensing, LLC, Redmond, WA (US)

(72) Inventors: Alexandre V. Grigorovitch, Woodinville, WA (US); Robert A. Little, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,030

(22) Filed: Mar. 7, 2018

(65) Prior Publication Data

US 2018/0196788 A1 Jul. 12, 2018

Related U.S. Application Data

(63) Continuation of application No. 13/892,314, filed on May 13, 2013, now Pat. No. 9,946,691, which is a (Continued)

(51) Int. Cl.
  *G06F 17/21* (2006.01)
  *G06F 17/30* (2006.01)

(52) U.S. Cl.
  CPC ...... *G06F 17/212* (2013.01); *G06F 17/30893* (2013.01)

(58) Field of Classification Search
  None
  See application file for complete search history.

(56) References Cited

U.S. PATENT DOCUMENTS 7,478,170 B2 1/2009 Ong et al.
7,577,906 B2 8/2009 Friedrichowitz et al.
(Continued)

FOREIGN PATENT DOCUMENTS

CN 1773496 A 5/2006
CN 101983380 A 3/2011
(Continued)

OTHER PUBLICATIONS

"Converting Microsoft Office Binary Files to Open XML Formats", Retrieved From: http://msdn.microsoft.com/en-us/library/office/jj649005.aspx, Retrieved on: Oct. 30, 2012, 4 Pages.
(Continued)

*Primary Examiner* — Asher D Kells
(74) *Attorney, Agent, or Firm* — Talem IP Law, LLP

(57) ABSTRACT

Content curation can be facilitated by an application programming interface (API) for creating an address for a block of content in a document identified through a location identifier as well as APIs for retrieving content from the created address and pushing or merging the content back to the created address. Access services including conversion and merge services can be used to provide the content blocks in a suitable format for various clients. A document view is described in which a plurality of content blocks are presented as a single document even though the content blocks may be retrieved using at least two uniform resource locators (URLs).

20 Claims, 14 Drawing Sheets

Related U.S. Application Data continuation-in-part of application No. 13/753,527, filed on Jan. 30, 2013, now Pat. No. 9,471,556.

(56) References Cited

U.S. PATENT DOCUMENTS

| | | | |
|---|---|---|---|
| 8,042,036 | B1 | 10/2011 | Sharma et al. |
| 8,054,496 | B1 | 11/2011 | Rehfeld |
| 8,275,880 | B2 | 9/2012 | Allard et al. |
| 8,285,681 | B2 | 10/2012 | Prahlad et al. |
| 9,471,556 | B2 | 10/2016 | Little et al. |
| 9,946,691 | B2 | 4/2018 | Grigorovitch et al. |
| 9,996,515 | B2 | 6/2018 | Little et al. |
| 2003/0182450 | A1 | 9/2003 | Ong et al. |
| 2004/0010755 | A1 | 1/2004 | Hamada |
| 2005/0044145 | A1 | 2/2005 | Quinn et al. |
| 2007/0067336 | A1 | 3/2007 | Horany |
| 2007/0106952 | A1 | 5/2007 | Matas et al. |
| 2007/0156745 | A1* | 7/2007 | Harrington .......... G06F 17/2229 |
| 2009/0158176 | A1* | 6/2009 | Kalaboukis ......... G06F 17/3089 |
| | | | 715/758 |
| 2009/0235161 | A1 | 9/2009 | Williams et al. |
| 2009/0249224 | A1 | 10/2009 | Davis et al. |
| 2009/0307762 | A1* | 12/2009 | Cudd, Jr. .......... G06F 17/30873 |
| | | | 726/5 |
| 2010/0017700 | A1* | 1/2010 | Odean ............... G06F 17/30929 |
| | | | 715/230 |
| 2011/0153727 | A1 | 6/2011 | Li |
| 2011/0296291 | A1 | 12/2011 | Melkinov et al. |
| 2012/0054594 | A1 | 3/2012 | Isaacson et al. |
| 2012/0066373 | A1 | 3/2012 | Ochoa et al. |
| 2012/0136936 | A1 | 5/2012 | Quintuna |
| 2012/0158673 | A1 | 6/2012 | Beyreis et al. |
| 2012/0185759 | A1 | 7/2012 | Balinsky et al. |
| 2012/0192055 | A1 | 7/2012 | Antebi et al. |
| 2012/0204250 | A1 | 8/2012 | Anderson et al. |
| 2012/0209907 | A1 | 8/2012 | Andrews et al. |
| 2012/0271825 | A1 | 10/2012 | Garthwaite et al. |
| 2013/0254259 | A1 | 9/2013 | Wilson |

FOREIGN PATENT DOCUMENTS

| | | | |
|---|---|---|---|
| JP | 2004046357 | A | 2/2004 |
| JP | 2004326176 | A | 11/2004 |
| JP | 2006163912 | A | 6/2006 |
| JP | 2006315801 | A | 11/2006 |
| JP | 2006318501 | A | 11/2006 |
| RU | 2419856 | C2 | 5/2011 |

OTHER PUBLICATIONS

"iBooks", Retrieved From: https://web.archive.org/web/20121030121047/http://ric.libguides.com/content.php?pid=300774&sid=2666314, Retrieved on: Oct. 30, 2012, 2 Pages.

"Super Simple—File Format Automation for Your App", Retrieved From: https://web.archive.org/web/20120623121533/http://saaspose.com/api/words, Retrieved on: Oct. 30, 2012, 3 Pages.

"Office Action and Search Report Issued in Taiwan Patent Application No. 102148746", dated Jan. 26, 2017, 9 Pages.

"Final Office Action Issued in U.S. Appl. No. 13/753,527", dated Sep. 11, 2015, 12 Pages.

"Non-Final Office Action Issued in U.S. Appl. No. 13/753,527", dated Feb. 12, 2016, 10 Pages.

"Non-Final Office Action Issued in U.S. Appl. No. 13/753,527", dated Mar. 13, 2015, 10 Pages.

"Final Office Action Issued in U.S. Appl. No. 13/892,314", dated Jan. 31, 2017, 11 Pages.

"Final Office Action Issued in U.S. Appl. No. 13/892,314", dated Apr. 8, 2016, 9 Pages.

"Non-Final Office Action Issued in U.S. Appl. No. 13/892,314", dated Sep. 29, 2016, 10 Pages.

"Non-Final Office Action Issued in U.S. Appl. No. 13/892,314", dated Oct. 16, 2015, 15 Pages.

"Non-Final Office Action Issued in U.S. Appl. No. 13/892,314", dated May 10, 2017, 11 Pages.

"Non Final Office Action Issued in U.S. Appl. No. 15/269,131", dated Aug. 11, 2017, 15 Pages.

"First Office Action and Search Report issued in Chinese Patent Application No. 201480006717.5", dated Dec. 4, 2017, 14 Pages.

"Second Office Action Issued in Chinese Patent Application No. 201480006717.5", dated Jul. 24, 2018, 8 Pages.

"First Office Action and Search Report Issued in Chinese Patent Application No. 201480006843.0", dated Jan. 19, 2018, 12 Pages.

"Search Report and Office Action Issued in Russian Patent Application No. 2015131617", dated Dec. 7, 2017, 10 Pages.

"Office Action Issued in Japanese Patent Application No. 2015-555394", dated Jul. 3, 2018, 6 Pages.

"Office Action Issued in Japanese Patent Application No. 2015-555394", dated Sep. 22, 2017, 13 Pages.

"Office Action Issued in Japanese Patent Application No. 2015-556074", dated Sep. 7, 2017, 6 Pages.

"Office Action Issued in Japanese Patent Application No. 2015-556074", dated Apr. 23, 2018, 4 Pages.

Bridgwater, Adrian, "Altova Reveals Release 2 of Mission Kit 2012", Retrieved From: http://www.drdobbs.com/database/altova-reveals-release-2-of-missionkit-2/232601493, Feb. 27, 2012, 4 Pages.

Churchill, Sam, "New Kindle File Format", Retrieved From: http://www.dailywireless.org/2011/10/21/new-kindle-file-format/, Oct. 21, 2011, 9 Pages.

Garsiel, et al., "How Browsers Work: Behind the Scenes of Modern Web Browsers", Retrieved from: http://www.html5rocks.com/en/tutorials/internals/howbrowserswork/#The_rendering_engine, Aug. 5, 2011, 57 Pages.

"Office Action Issued in Mexican Patent Application No. MX/a/2015/009822", dated Apr. 7, 2017, 4 Pages.

North, Meg, "Can the Sony Reader Take Kindle Books?", Retrieved From: https://web.archive.org/web/20140706191412/http://www.ehow.com/info_12130591_can-sony-reader-kindle-books.html, Retrieved on: Oct. 30, 2012, 2 Pages.

Ostrovsky, Igor, "What Really Happens when you Navigate to a URL", Igor Ostrovsky Blogging, Feb. 9, 2010, 14 Pages.

"International Preliminary Report on Patentability Issued in PCT Application No. PCT/US2014/013253", dated May 15, 2015, 7 Pages.

"International Search Report & Written Opinion Issued in PCT Application No. PCT/US2014/013253", dated May 6, 2014, 11 Pages.

"Second Written Opinion Issued in PCT Application No. PCT/US2014/013253", dated Feb. 11, 2015, 6 Pages.

"International Preliminary Report on Patentability Issued in PCT Application No. PCT/US2014/013254", dated May 15, 2015, 8 Pages.

"International Search Report & Written Opinion Issued in PCT Application No. PCT/US2014/013254", dated May 8, 2014, 10 Pages.

"Second Written Opinion Issued in PCT Application No. PCT/US2014/013254", dated Feb. 11, 2015, 7 Pages.

* cited by examiner

APPLICATION PROGRAMMING INTERFACES FOR CONTENT CURATION

This application is a continuation of U.S. application Ser. No. 13/892,314, filed May 13, 2013, which is a continuation-in-part of U.S. application Ser. No. 13/753,527, now U.S. Pat. No. 9,471,556, filed Jan. 30, 2013.

BACKGROUND

Collaboration and file sharing is becoming easier as collaboration software improves. However, not every device can support co-authoring and collaboration. Some devices are not collaboration-ready or require all systems accessing and modifying the digital content to be running a same program. The ability of a person to access, share, and co-author digital content can depend, in part, on whether the person has the appropriate software program that recognizes the format of the digital content and a device that can execute the program so that the digital content can be viewed, modified and have those modifications propagated and reflected as being part of the digital content when accessed by another person (or the same person on another platform).

With the proliferation of devices using different platforms, it can be a challenge to share, access, and edit content of one format with a device running a program capable of only accessing and displaying a different format or capable of only editing the content with an earlier version of a feature. In addition, as new features are added to new versions of certain applications, the new versions must support backwards compatibility and/or have extensibility built in to support future versions. Furthermore, it may be desired to combine content from multiple files, some of which may be of different file formats or versions.

BRIEF SUMMARY

Application programming interfaces and access services are provided in which content from one or more resources can be presented to a user as a single document. This document, or view, can include application (e.g., viewer, editor) defined blocks of content or user defined blocks of content that can be separately addressable and accessed through the access service. Content curation can be facilitated through application programming interfaces (APIs) enabling creation of an addressable block of content from within a larger document framework and content retrieval of the addressable block of content.

According to an embodiment, a document served to a client by a system performing conversion and merge services is a set of experiences and the content inside of it. The document or a selected block of content of the document can be stored as a master document in a first file format at a location retrievable by the system and, when requested by the client, the document can be converted to an appropriate file format and served to the client. The served document can also take into consideration the version of features supported at the client.

The served document can be displayed at a client device. The services extend the reach of a document (to devices across varied platforms) and create an experience for that document that is suitable for the client device. The document does not need to look exactly the same on each client. Instead, the document can be customized for the user's experience and to suit the device. Once displayed at the client device, a user can locally modify the document. The modifications can include modifications to the content as well as to data associated with the document. For example, annotations, comments, text editing, image editing, and other modifications may be made. The user can then save the modifications back onto the server. The server can merge the modifications even where the document that the user modified is of a different file format or contains different versions of a feature.

In addition to merging modifications back into a master document, all or an identified part of the document displayed at the client device can be saved as another master document and assigned an address by an address service.

According to an implementation, a first view of a first document can be displayed. The first document can be served to a client by being retrieved from a first address and converted, if needed, to an appropriate format or feature version. A user working within the document view displayed at the client can select a subset of the content for editing or other further action. The selected portion can be an identified content. The identified content can be identified using a location identifier such as a paragraph identifier, a line identifier, a character identifier, a range, a part identifier, or a combination of these identifiers. An address service can be invoked to obtain a second address for the identified content. This subset of content can then be accessible and separately modifiable through the second address.

According to another implementation, a document view can be provided to the client that includes content from at least two resources. For example, an access service can be invoked with a request for at least a first block of content from a first address and a second block of content from a second address. The first block of content and the second block of content can be combined. The combined content blocks include location identifiers, which can be used to create new addresses.

A document view can be provided (or served) that includes a plurality of content blocks with location identifiers and content retrieved using at least two uniform resource locators (URLs). One or more content blocks (and even sub-sets of a content block) can be selectable for assigning a new URL and separately accessible through this new URL.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
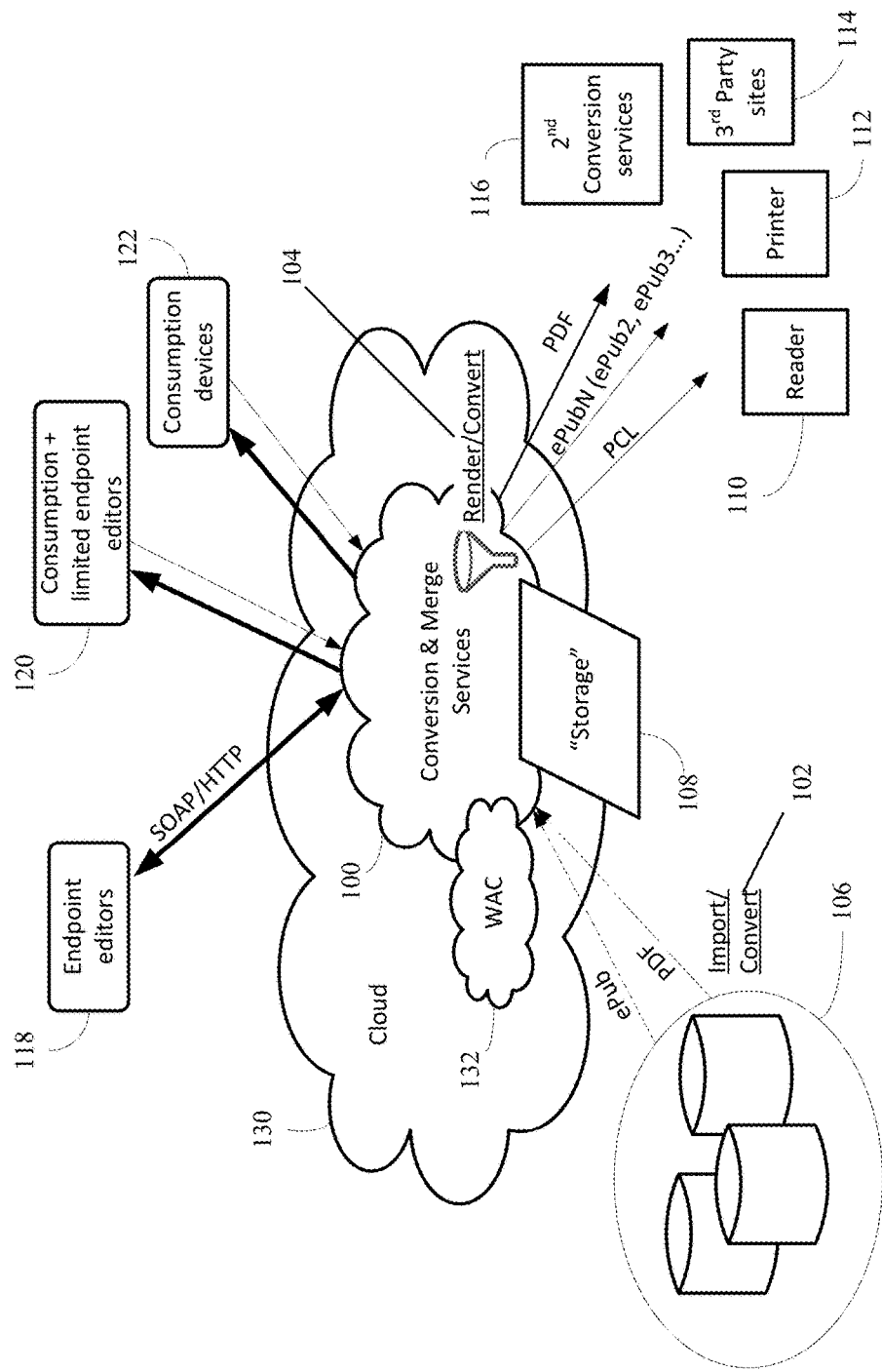
FIG. 1 shows a diagram of an operating environment in which certain embodiments may be carried out.

Application programming interfaces and access services are provided in which content from one or more resources can be presented to a user as a single document. This document, or view, can include application (e.g., viewer, editor) defined blocks of content or user defined blocks of content that can be separately addressable and accessed through the access service. Content curation (and dissemination) can be facilitated by application programming interfaces (APIs) for creating an address for an identifiable region of a document and retrieving content from the created address.

Content curation is the organization and presentation (or sharing) of content from various sources.

Even though certain pieces of content may be located separate from each other and even stored in different formats from each other, these pieces of content can be combined as a single document that can be viewed as a cohesive piece by a reader, editor or other client.

This can be accomplished by having an address for each defined block of content. An access service can take a request including one or more content block addresses, retrieve the various content blocks from the one or more content block addresses, and provide the combined content to the client. Within the document view, the boundary of a block can be dynamic to the extent that a client may combine or break-up blocks. For example, a client may present a view of a document that originally is formed of one block (having a single address through which the elements making up the document can be accessed).

While viewing the document, a user may want to capture at least one aspect of the content for use in another document or application. In this scenario, the user may request an address for an identified portion of the document. The portion can be identified as a block of content using location identifiers. When the new address is created, another client (or server) may access the block having an address created using the identified portion by getting the content from that address location. In some cases a document may be created from a plurality of these different blocks. In some cases, when a block is updated, the document is updated. It should be understood that a single address may refer to a resource that involves multiple storage devices and a distributed computing environment.

Electronic documents are generally understood to be a digital equivalent to a paper document, where document editors facilitate the creation, annotation, modification, and, recently, sharing and collaboration, of content.

The modifications can include modifications to the content as well as to data associated with the document. For example, comments, text editing, image editing, and other modifications may be made. Modifications to files can include actions that are additive, subtractive, actions that provide additional content, rich content, actions adding comments, and actions modifying an image within an image editor.

Certain embodiments of the invention add a new feature to documents—the document as a service, where a document provides a set of experiences and the content inside of it. The set of experiences correspond to a set of services including content access services of conversion and merge services. The conversion services enable the content of the document to be customized for each client on which the document is viewed and the merge services enable modifications to the document to be re-integrated with a master document. The master document may be an aggregation of content, metadata, and modifications made to the document (including modifications to content and modifications to metadata). In some cases, the master document can appear to be a highest fidelity document.

Thus, when modifications made from within a lower fidelity editor or modifications using an earlier version of a feature are re-integrated into the master document, the service can perform fidelity rehydration.

Fidelity rehydration refers to the taking of content modified by an earlier version of a feature—or a file format having editors with less functionality—and returning the content to a full functionality, latest feature version. As an example, given two versions of a graph feature—a first version having rich charts (such as 3D charts) and a second version that is only able to interpret the charts as static images—after content is edited in an editor supporting the second version, the static images can be rehydrated back to being 3D charts for viewing/editing in an editor supporting the first version. The first version may be a future or later version of the feature and the second version may be a previous or earlier version of that feature. In other cases, both versions may be released at a same time, but with intentional differences in available functionality.

Although the master document is referred to as a document, the master document can be stored in any format suitable for tracking content and newest editing features.

Through these services, consumer devices can access and modify content across various platforms without adding complexity to a client-side software or consumption device.

To further the flexibility of viewing a document, blocks (user or application defined portions) of a document can be separately accessed, viewed and modified for independent use or merging back into a master document.

A file format (for a document or other content and related information) refers to the manner in which information related to the content of a file (and, in some cases, associated information) is encoded and stored on a computer-readable medium. A file type may be used interchangeably with file format, but generally refers to the taxonomy of file formats. For example, a file type may be a document file type, which includes file formats of hypertext markup language (HTML), ADOBE Portable Document Format (PDF), MICROSOFT WORD document (DOC), Office Open Extensible Markup Language (OOXML) format (DOCX) and the like. MICROSOFT WORD is a registered trademark of Microsoft Corp.; ADOBE PDF is a registered trademark of Adobe Systems, Inc.

As used herein "consumption format" refers to a file format supported by a particular device or software program (e.g., a "supported file format"). In addition to being a supported file format, the consumption format can include features related to file size, functionality, and the like that relate to how a device (or program) may be able to support varied user experiences.

Returning to the document-as-a-service paradigm, the content access services including conversion and merge services can be provided as part of a cloud service experience. In this manner, content may be created in one format and then be accessible and editable across any platform in a manner that may provide a seamless experience to a consumer of the content.

FIG. 1 shows a diagram of an operating environment in which certain embodiments may be carried out.

Referring to FIG. 1, the operating environment can include one or more cloud or web services. The content access services 100 described herein may be cloud services or web services.

A cloud service generally refers to hosted services providing scalable processing and storage capabilities. Cloud computing may often include virtualized resources. The resources presented by cloud computing are in themselves provided as a service, where cloud computing customers rent usage of resources from a third-party provider that owns the physical infrastructure.

Web services can be provided and/or hosted by a cloud service (e.g., as part of a large-scale distributed computing environment). A web service is a software system that supports interoperable machine-to-machine interaction over a network and enables software to connect to other software applications.

A web service provides a collection of technological standards and protocols. For example, a web service provides functions that may be implemented by a software or hardware agent that sends and receives messages (e.g., the computing platforms requesting and providing a particular service). Applications can access web services via ubiquitous web protocols and data formats such as hypertext transfer protocol (HTTP), extensible markup language (XML), Web Services Description Language (WSDL), JavaScript Object Notation (JSON), and SOAP (originally an acronym for simple object access protocol).

Representational state transfer (REST) protocols are useful when accessing named resources and may be used in certain embodiments of the invention. In other embodiments of the invention SOAP may be utilized. In some cases, a File Synchronization Service via SOAP over HTTP (FSSHTTP) from Microsoft Corp. may be used.

Content access services 100 may be implemented using one or more physical and/or virtual servers communicating over a network. The network can include, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

The content access services 100 can include an import/convert portion 102 and a render/convert portion 104. Documents from various sources 106 can be imported to the content access services 100. The import/convert portion 102 can facilitate self-publishing by reducing or removing constraints to getting content into the particular formats required by readers. For example, self-publishing to a bookstore or other repository or store may be accomplished without requiring the creator to work within a specified file format. By making it easier for creators to publish their work, reader users can have access to more content.

A "reader" refers to a software application and/or electronic device designed primarily for the purpose of reading electronic books (ebooks) and/or other electronic content. Readers often include at least some basic editing capabilities, such as annotating, highlighting, bookmarking, and scribing.

Example software ebook readers (or e-readers) include GOOGLE READER application from Google Inc., APPLE IBOOKS application from Apple Inc., ADOBE ACROBAT EBOOK READER application from Adobe Systems Inc., and MICROSOFT READER application from Microsoft Corp. Example hardware ebook readers (or e-readers) include the AMAZON KINDLE brand e-reader from Amazon.com Inc. and BARNES AND NOBLE NOOK brand e-reader tablet available from Barnes & Noble Inc. An ebook is a text and/or image based publication in digital form that can be read on an ebook reader. There are a variety of ebook and other digital content formats used to create and publish content, such as electronic publication (ePub), HTML, PDF, printer command language (PCL), and extensible markup language (XML).

In some cases, imported documents (e.g., through import/convert portion 102) may be stored or appear to be stored (by having an address or Uniform Resource Identifier stored) as part of the cloud (108). The content access services 100 may resolve to operations on storage 108 or delegate certain operations to another service (that may directly or indirectly access storage 108).

Document files can be exported from the content access services 100. Before being exported, a document file, such as one of the imported documents, can be converted to various formats for consumption (e.g., rendering for display, interaction, modification, or additional actions including printing and further conversions) by endpoints such as reader 110, printer 112, third party sites 114, and secondary conversion services 116.

An endpoint refers to the means by which a consumer accesses a service—the entry point for the interaction. According to various embodiments, endpoint customization is provided that extends the reach and changes the way the content is consumed based on device.

The endpoints can be one or more consumer devices.

A consumer device refers to a computing device that is used to consume (i.e. use for viewing/reading, editing, or annotating) data or documents retrieved or purchased from a service or source. The consumer device may be a primarily single purpose computing device used for reading electronic books (often referred as a reader) or a multi-purpose computing device on which reader or viewer software for reading electronic books or other electronic/digital content may be provided.

A "viewer" refers to a software or hardware application that can display or appear to display a document or data in a format or file type associated with a particular program. A viewer for a particular file format is able to understand the particular file format and present a visualization of the file. Typically, a "viewer" of a file format is assumed to be able to visually present the file format with high fidelity, maintaining the original intent of the author. A "reader" is a type of viewer that includes functionality primarily associated with a "reading" experience, such as providing animated page turns, remembering a last reading position, providing a dictionary to look up words, and the like.

The services extend the reach of a document (to devices across varied platforms) and create an experience for that document that is suited for the client device. The document does not need to look exactly the same on each client. Instead, the document can be customized for the user's experience and to suit the device.

Third parties can use the document to create additional user experiences.

By knowing the device, the system (e.g., through services 100) can provide a customized file formatting. As an example scenario, a NOOK reader or a KINDLE reader user may use that device to browse for available content to read. The service 100 can determine what device is being used and appropriately tailor the presentation of content. For example, ePub2 or ePub3 format may be sent to a NOOK reader and AZW format may be sent to a KINDLE reader.

Once the customized file is sent to the device, the file can be saved back to the server (via services 100). For example, specific actions (modifications such as annotating or editing within the NOOK reader, KINDLE reader, or a tablet running an editor application) can be taken with respect to the file served to the client, and these modifications merged to a master document for the file.

Certain embodiments of the invention enable the changed block(s) to be assigned a separate address for independent access without merging with the master document.

In further embodiments, by also knowing the user (for example, by receiving an identifier from the user, such as when the user logs in to their account from a device), the system (e.g., through services 100) can further enable a user to access their own files over a network on many devices without the user having to be concerned with the version or file format their device can handle. In addition to enabling a user to access their own files, by knowing the user, the system can customize a file to present specific content in a document related to a task associated with the user. For example, where a user is tasked with reviewing a paragraph, the paragraph may be provided to the identified user instead of all users that may have access to the document. In one embodiment, this can be accomplished by providing that particular user a link or address to the paragraph block.

Endpoints may have two general categories of communication with the service 100. One is a two-way rich experience and the other is a more limited experience. In both cases, by using embodiments of the invention, endpoints are not required to handle file format conversion, be able to render all formats, or include a layer for co-authoring of content.

Endpoints of varied richness can be supported by various embodiments of the invention. As used herein, "richness" refers to the spectrum of available experiences with an application and its ability to present a user with particular content and functionality. For example, a richest consumption experience can be available through devices supporting full featured applications in which editing and manipulation of content is available (e.g., endpoint editors 118). A more limited experience includes bite-sized authoring tools (e.g., limited endpoint editors 120) in which some functionality for editing and manipulation of content is maintained. A difference between the more limited experience (or "light-weight editing") and a full featured editor (or "heavy editing") is that light-weight editing may only support annotations and commenting.

Readers (e.g. consumer devices 122) in which the content may be viewed can have a range of supported richness. All editor types, as well as versions of a feature, can be supported.

The conversion and merge services provided by the access services 100 may be requested directly by a client device or another server (e.g., reader 110 or consumption device 122, endpoint editor 118, or consumption and limited endpoint editors 120). In some embodiments, a server (such as described with respect to FIG. 2) or third party site (e.g., 114) or secondary conversion service (e.g., 116) may access the services 100 on behalf of a client device. A printer 112 may also receive content from the conversion and merge services 100 either directly or through another client device.

One framework by which the endpoint editors 118 may communicate with the web service (e.g., service 100) is via a framework that allows client applications to efficiently synchronize changes to a document and file management and collaboration program running on a server, such as the MICROSOFT SHAREPOINT web application platform, using a FSSHTTP application programming interface (API). The client side of the FSSHTTP protocol is a pass-through. For example, calls made by a higher-layer protocol, such as the application layer, are passed directly to the transport layer, and the results returned by the transport layer are passed directly back to the higher-layer protocol or application.

An API is generally a set of programming instructions and standards for enabling two or more applications to communicate with each other and is commonly implemented as a set of HTTP request messages and a specified format or structure for response messages. The messages can contain an information resource. A resource is information that can be identified by a uniform resource identifier (URI) and may be a file, a dynamically-generated query result, the output of a common gateway interface (CGI) script, a document that is available in several languages, and the like.

According to some embodiments, an API is provided for creating an address to access a resource. An API can be further provided to request the content at the address created in order to access the resource. The request for content can include a request for a particular format for the content. An API can be further provided to enable content to be put back at (or "push" to) the address. The push may include a merge or an overwrite.

The conversion and merge service 100 may be associated with broader cloud services 130 as well as a web application component (WAC) 132. WACs are components that enable a user to view and edit documents in the browser. WACs can function both as an endpoint by consuming and editing content and a service by providing some merge and conversion service functionality. In such embodiments, users have access to application software and databases on the cloud, which manages infrastructures and platforms. End users access software applications hosted on the cloud through a browser or app (an application designed for mobile devices such as smartphones and tablets). An example is described with respect to FIG. 2.

Figure 2:
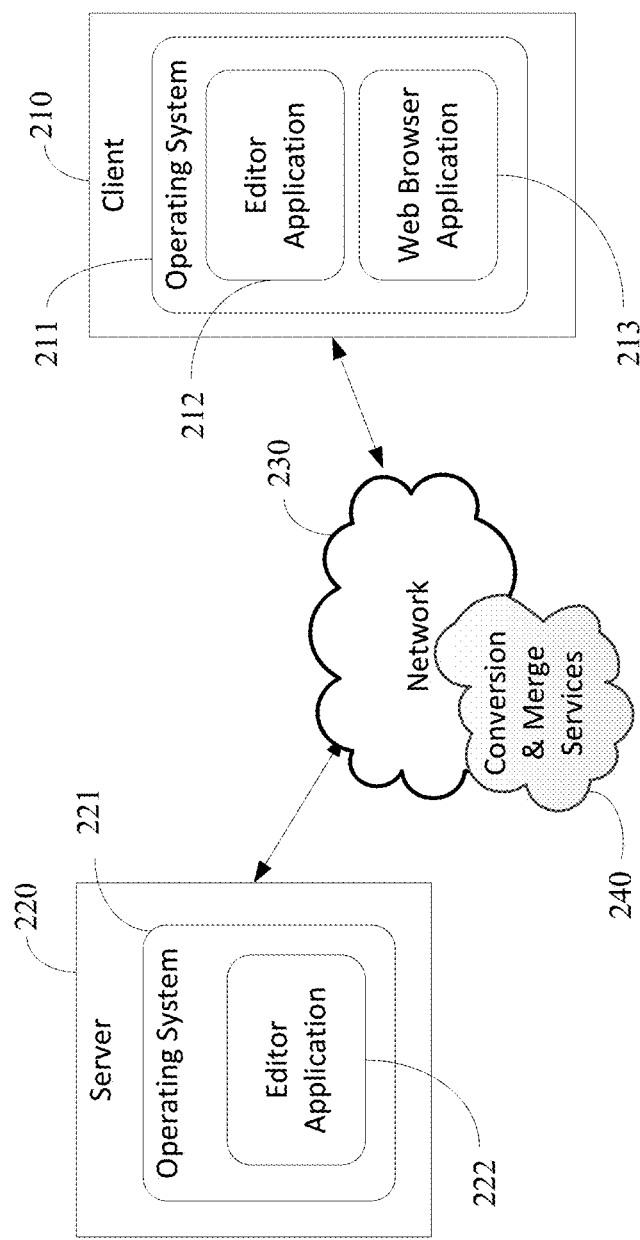
FIG. 2 shows an operating environment for an endpoint according to an embodiment of the invention.

FIG. 2 shows an operating environment for an endpoint according to an embodiment of the invention. Referring to FIG. 2, a client 210 and a server 220 communicate via a network 230.

The network 230 may be an internet, an intranet, or an extranet, and can be any suitable communications network including, but not limited to, a cellular (e.g., wireless phone)

network, the Internet, a local area network (LAN), a wide area network (WAN), a WiFi network, an ad-hoc network, or a combination thereof.

As previously described, such networks may involve connections of network elements, such as hubs, bridges, routers, switches, servers, and gateways. The network 230 may include one or more connected networks (e.g., a multi-network environment) including public networks, such as the Internet, and/or private networks such as a secure enterprise private network. Access to the network 230 may be provided via one or more wired or wireless access networks (not shown), as will be understood by those skilled in the art.

The client 210 and the server 220 can involve computing systems configured with one or more central processing units (CPUs), memory, mass storage, and I/O devices (e.g., network interface, user input device). Elements of the computing system can communicate with each other via a bus. The hardware platform of computing systems can be embodied in many forms including but not limited to, a personal computer, a server computer, a hand-held or laptop device, a multiprocessor system, a microprocessor-based system, programmable consumer electronics, and a distributed computing environment (e.g., cloud-based computing systems) that includes any of the above systems or devices (and where application functionality, memory, data storage and retrieval and various processing functions may be operated remotely from each other over a distributed computing network, such as the Internet or an intranet).

In certain embodiments, the client 210 can be embodied as a computing device including, but not limited to, a personal computer, a tablet, a reader, a mobile device, a personal digital assistant (PDA), a smartphone, a laptop (or notebook or netbook) computer, a gaming device or console, a desktop computer, or a smart television.

In certain embodiments, the server 220 can be embodied as a computing device including, but not limited to, a server computer, an enterprise computer, a personal computer, a multiprocessor system, a microprocessor-based system, and a combination thereof. It should be understood that the listing of client computing devices and the server computing devices is not intended to be limiting and that the client and server may be embodied in the same or different form.

The client computing device 210 is configured to execute an operating system 211 and one or more application programs such as, in the illustrated embodiment, a word processing or editor application 212, a web browser application 213, and/or one or more other applications.

The operating system 211 is a computer program for controlling the operation of the client computing device 210. The application programs are executable programs configured to execute on top of the operating system 211 to provide various functionality such as described herein. A word processing application is an application program generally configured to facilitate typing, editing, formatting, saving, printing, and commenting. An editor application may be any application providing editing or annotating tools and may be a word processing application or other productivity applications such as MICROSOFT OFFICE available from Microsoft Corp., GOOGLE DOCS available from Google Inc., APACHE OPENOFFICE available from the Apache Software Foundation, or ZOHO OFFICE available from Zoho Corporation.

Productivity applications include, but are not limited to, word processing programs, collaboration programs, presentation programs, spreadsheet programs, and storytelling/note-taking programs. [008I] The web browser application 213 is an application program for retrieving and traversing information resources on the World Wide Web ("the Web"), as well as resources provided by web servers in private networks via the network 230, and presenting the information resources to a user (e.g., rendering for display). Moreover, the web browser application 213 allows a user to access information and various functions provided by a server.

The illustrated server computer 220 is configured to execute a server operating system 221, one or more application programs such as a server word processing or editor application 222, and/or one or more other applications. The server 220 may also be hosting a service (and incorporating WACs 132 such as described in FIG. 1).

The server operating system 221 is a computer program for controlling the operation of the server computer 220, and the application programs are executable programs configured to execute on top of the server operating system 221 to provide various functionality described herein. The server word processing or editor application 222, in some embodiments, is a web-based application program configured similarly to the word processing or editor application 212 described above. The server word processing or editor application 222 may provide functionality that is identical to the word processing or editor application 212.

In some embodiments, the server computer 220 is configured to execute the server word processing or editor application 222 and the client computing device 210 is configured to access the server computer 220 to interact with the server word processing or editor application 222 in a client/server configuration.

Communication between computing devices in a client-server relationship may be initiated by a client sending a request to the server asking for access to a particular resource or for particular work to be performed. The server may subsequently perform the actions requested and send a response back to the client.

In one embodiment, the client web browser application 213 is used to connect with a server, for example server 220, in order to access a web-based word processing or editor application 122.

The client 210 and server 220 can access a conversion and merge services 240 over the network 230. Applications running on client 210 and server 220 can access the services 240 via ubiquitous web protocols and data formats such as HTTP, XML, JSON and SOAP, or via the FSSHTTP protocol.

Figure 3:
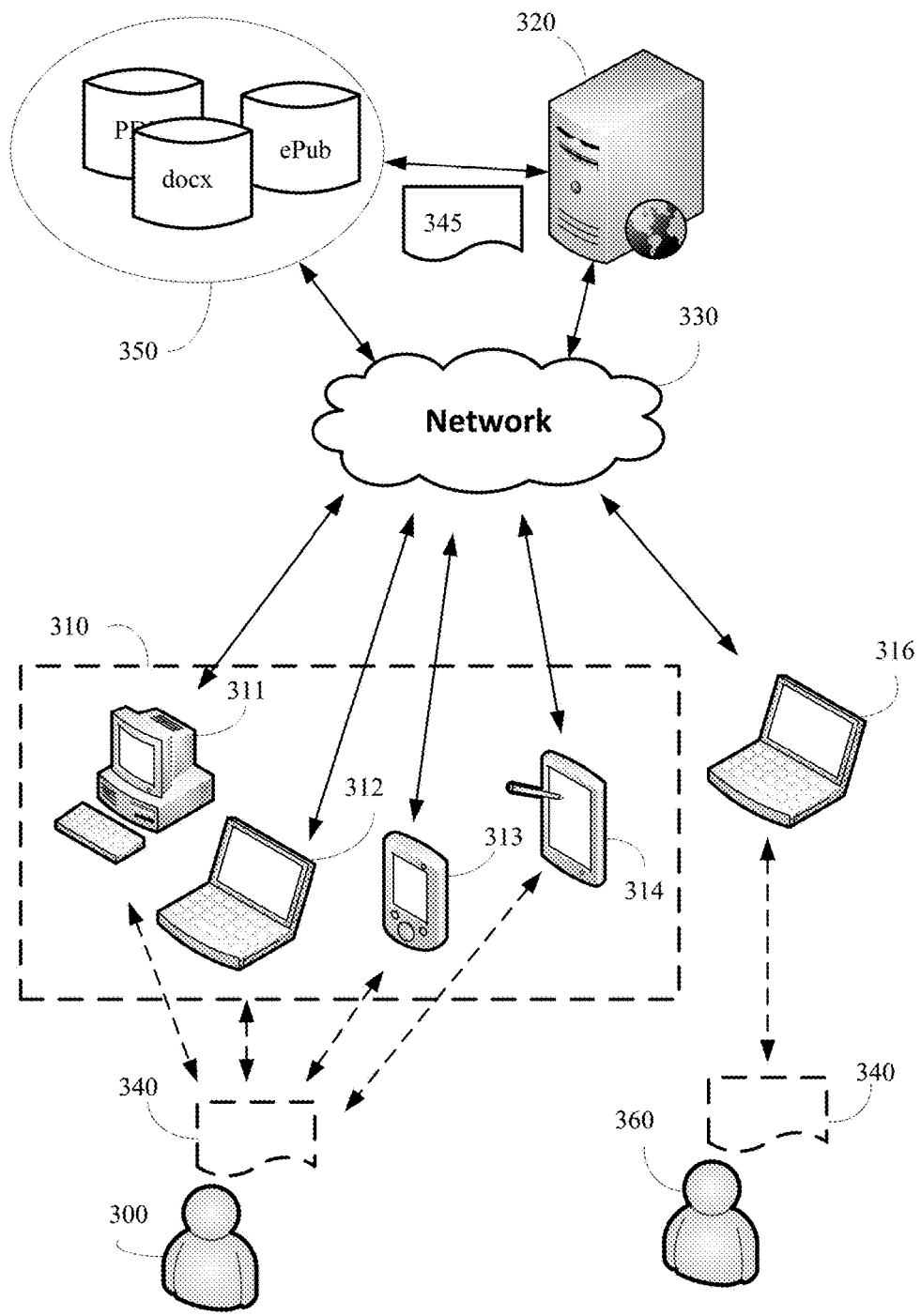
FIG. 3 shows a computing environment according to an embodiment of the invention.

FIG. 3 shows a computing environment according to an embodiment of the invention. As illustrated in FIG. 3, a computing environment for a user 300 can include multiple clients 310 (such as desktop 311, laptop 312, smartphone 313, tablet 314, reader (not shown), game console (not shown), smart television (not shown), and the like), and a server 320 connected through a network 330.

As described above with respect to network 230 of FIG. 2, the network 330 may be an internet, an intranet, or an extranet, and can be any suitable communications network including, but not limited to, a cellular (e.g., wireless phone) network, the Internet, a local area network (LAN), a wide area network (WAN), a WiFi network, an ad hoc network or a combination thereof.

The client(s) 310 and server 320 can involve computing systems configured such as described with respect to client 220 and server 230.

Each client 310 can include a software application for viewing and editing (and/or annotating) a document (and its content) 340 provided by the server 320 through the content access services.

A user 300 may have multiple clients 310 (e.g., a desktop computer 311 in the office, a laptop 312 at home, and a mobile telephone/smartphone 313), and may use software ebook readers or document viewers or editors running on these clients 310 to read ebooks and other digital content retrieved from the server 320, as well as edit and/or annotate the content.

The server 320 is a hardware device and/or software program configured to provide (as part of content access services) a conversion service and a merge service. The conversion service enables users to access content (even the user's own content) that may be of a file format not directly supported by a specific client 310 that the user is using to access the content; and the merge service re-integrates changes made by the user 300 to a master document 345 stored in database 350.

One or more of the services (or functions) provided by the server 320 can be executed in a cloud computing environment. In addition, the server 320 can include applications (and/or host a service) exposed through an API.

According to certain embodiments, a system, involving server 320, may be provided that can import a document from a client 310 or database (such as database 350). The imported document may be considered the master document 345, or a master document 345 can be created from the imported document and stored in a database 350 associated, for example, with the server 320.

In one embodiment, when "importing" the document, an address or uniform resource locator (URL) may be created for the document. Then, when a client (or consumer device) requests the document (located at the created address), the document can be retrieved and provided to the consumer device. According to certain embodiments, the address creation can be performed for all or parts of a document. In a further embodiment, the address creation may be exposed through an API.

The server 320 can convert the document 345 into a format suitable for a consumer device (e.g., desktop 311, laptop 312, smartphone 313, tablet 314, reader (not shown), game console (not shown), and the like).

A user 300 can have access to a suitable version of the master document 345 (e.g., in the form of document 340) across each device (e.g., 311, 312, 313, 314). For example, document 340 can appear across any device and platform. A user 300 working on the document 340 within one program, for example on laptop 312, can save the document with those changes. Saving the document can invoke the merge services. For example, as shown in FIGS. 5B-5D, the entire document (FIG. 5B), the change (delta) (FIG. 5C), or a particular modification (FIG. 5D) can be returned to the server for merging with the master document.

The actual physical file may or may not be stored in the cloud (as part of cloud storage—such as database 350). The file may be stored on a server or computer or any storage location that can be accessed by the service over a network. The master document (or other imported file) can be stored at the server 320 as a collection of addressable files, which may be imported and converted upon request. As described with respect to FIG. 11, addresses may be created for sub-sets of content in a document and each of these addresses used to obtain new "master documents" that may be combined or separately imported and/or converted upon request (see also FIG. 9).

Another user 360 on a client device (such as laptop 316), or the first user 300 on a second device such as tablet 314, can open the document 340 and their experience is that the document 340 is a document workable within the device 316 (or the second device 314 on which the first user 300 is accessing the document). The second user 360 with device 316 (or the first user 300 on a second device) can then save the document after editing and the service will merge the changes.

According to embodiments, each client 310 believes it has a file that was stored in the appropriate format for the client. There is no need to change the file at the client in order to open the file and access the data. For example, applications can still open documents as expected—the server takes care of whether the client receives a suitable file format. At the client 310, the user (300, 360) opens, changes, and saves the document according to expected processes. The server understands the limitations of the endpoint and provides the appropriate format to the device.

The server 320 and the consumer/client device 310 communicate such that the system knows what type of device or software is available on the client 310 and tailors the user's experience accordingly.

The server 320 can be configured to identify the user agent/client characteristics at the endpoint. The identification may be based on an active or implicit notification sent from the endpoint (e.g., client 310) to the server 320. The server 320 can further be configured to tailor the client experience as well as the persisted experience (e.g., the stored copy of the master document).

According to certain embodiments, the served document 340 is not only reflowed to accommodate smaller (or larger) display sizes, additional accommodations can be made.

Reflowing refers to the accommodation of viewing content for a limited display or window, where text may remain at its original size for ease of reading while images reduce in size so that they can be viewed at a glance.

As an example of additional accommodations, a high resolution device can be served high resolution content (a higher form factor can receive more objects), whereas a phone may receive a lower resolution image (instead of, for example, a 12 megapixel version of a picture in a document). In addition, a touch enabled device may have touch responsive features added to the document. Further customized endpoint services can also be provided (e.g., exposed through the API), including, but not limited to, those enabling commenting on a document and adding work-flow elements (such as to-do items). Security settings and rights management may also be tailored to the client. For example, when an older version or certain file formats are served to a client, the document can be provided to function in read-only to minimize destructiveness of saving in a lower fidelity version, but allow the document to be saved—as a different copy than the master.

In some embodiments, the client can save the lower fidelity (or different format or feature version) by requesting an address using a create address API.

Not only is the served document 340 in a format suitable (or even customized) for rendering by a particular consumer device, but modifications to the document 340 can be re-integrated with the master document 345. The server 320 can re-integrate the modifications by knowing what type of device and/or software is available at the client. For example, where client devices use different platforms (and file formats), the server 320 can know the fidelity that may be lost in a conversion and reconstitute any changes back on the server.

Similarly, where client devices use different versions of a feature, the server 340 can know the version used and adjust accordingly. Features include, but are not limited to, utilities for manipulating and editing text, charts, equations, text effects and graphics (including MICROSOFT SMARTART graphics), digital content (including videos), bibliography styles, threaded commenting, spell check, dictionary, language, and utilities for manipulating and editing graphics.

The service can provide backwards and forwards compatibility.

For example, a document in a recent version of MICROSOFT WORD can be served to a client running an earlier version of MICROSOFT WORD without the client having to perform the conversion to the earlier version. Furthermore, instead of serving a read-only version (to avoid issues with saving back the lower fidelity version), the client running the earlier version may edit the document because the server, knowing how the earlier version is destructive to the full fidelity version (and what the images replacing high fidelity content represent), can reconstitute the data back on the server (i.e., perform fidelity rehydration).

Fidelity rehydration can be performed at the server because the server knows what form the content was provided as well as the specific constraints and actions that may be carried out with respect to the file while the file is in a particular file format.

Figure 4:
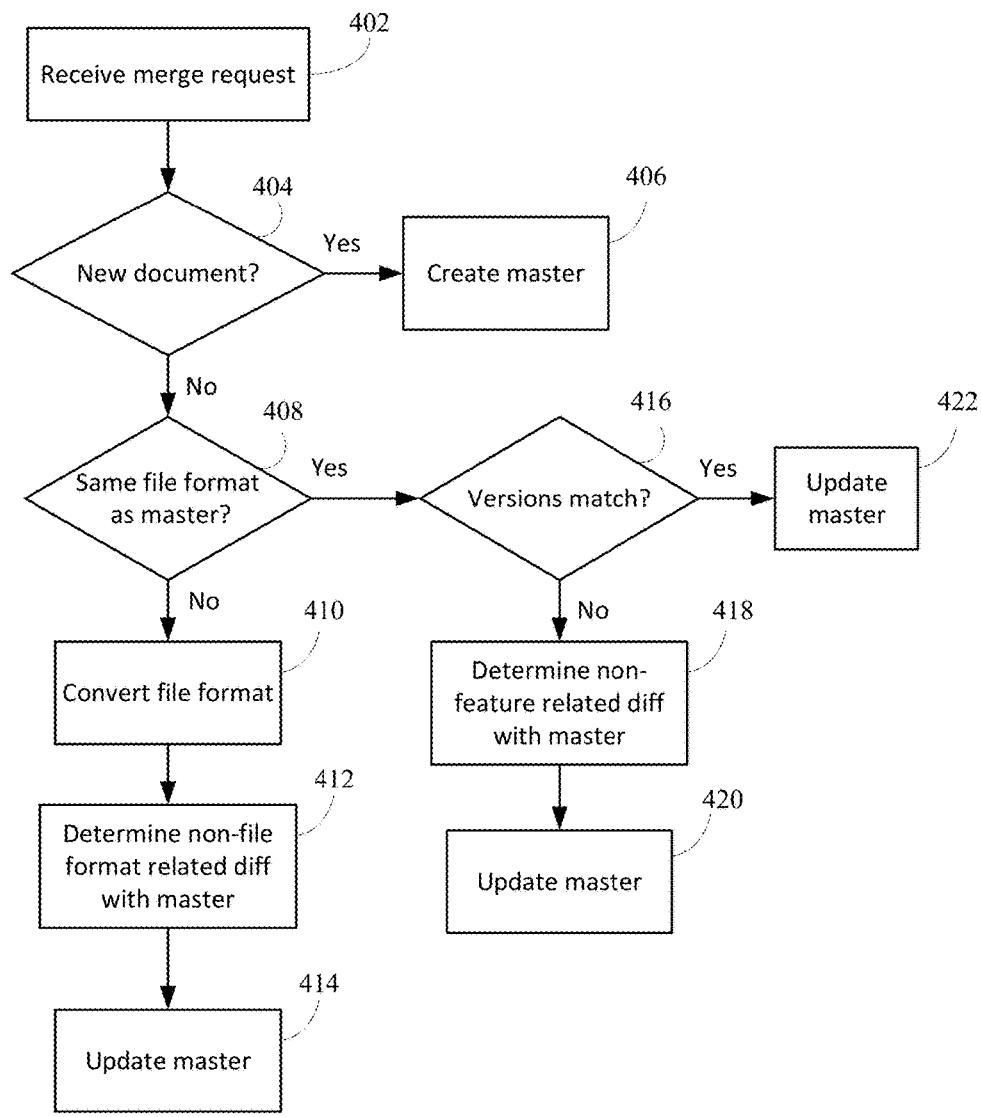
FIG. 4 shows an example process flow for a conversion and merge service according to an embodiment of the invention.

FIG. 4 shows an example process flow for a conversion and merge service according to an embodiment of the invention. Referring to FIG. 4, at operation (402), when the server receives a merge request, the request and a document may be provided. The server can determine whether the document is a new document or exists on the system (404). If the document is a new document (or a new copy), the system can create a master (406) from the document. The master can be the document (using a same file format and feature version) or the master document can be created by converting the document into a particular file format and feature version.

By creating the master document, certain embodiments can create a document-as-a-service experience for users. In particular, the master document includes the content making up the master document along with a set of actions the creator and others may take with respect to the document. A customized experience can be provided to a consumer and the ability to edit the content can be exposed as part of the service.

In one implementation, creating the master document involves creating an address (which may involve creating a globalized unique identifier (GUID)). This creation of an address by the service can be extensible in that other services or applications can may the service to create and address.

Returning to operation (404), if the document is determined to not be a new document (because, for example, a master document already exists on the system), the server can determine whether the document is of a same or different file format as the master document (408). In response to a determination that the file formats are different, the server can convert the file format of the document to the file format of the master document or some other format understood by the system (410) and then automatically determine the differences between the document and the master document (412) and merge the differences (delta) to update the master (414). Merging the delta into the master document enables a user at one device to do something with a document and have the change associated with the document so that the next person (or the same person on a second device) who accesses the document sees those changes reflected onto the document that second person (or second device) receives.

Returning to operation (408), if the file formats are the same, a determination can be made as to whether the feature version supported by the document is the same as the feature version supported by the master (416). In response to a determination that the feature versions are different, the server can determine the non-feature related differences (delta) between the document and the master (418) and use the determined delta to update the master (420) without losing fidelity.

By determining file format and/or feature version, the file as a whole and the content within the file can be analyzed in order to transform one document to another document or transform content from one version to another version. Where there is no difference between file format and feature version between the document and the master, the differences may be automatically updated at the master (422) or the master can be replaced by the document.

Figure 5A:
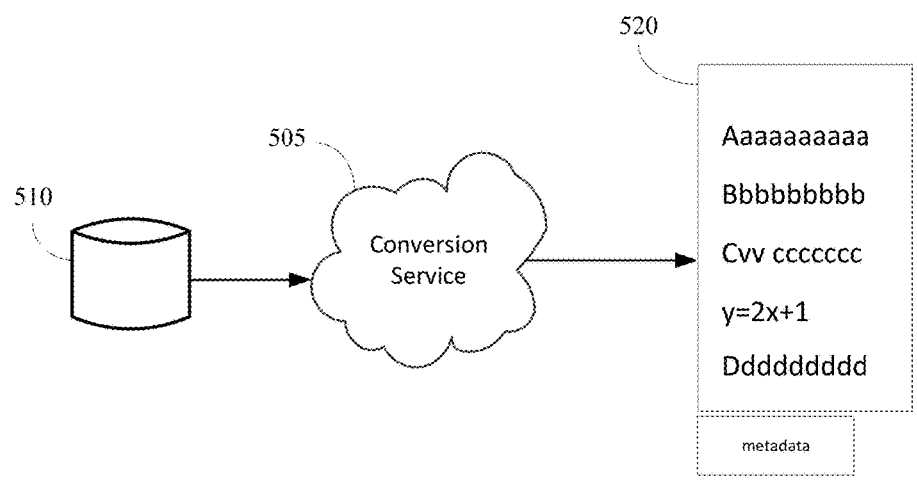
FIGS. 5A-5D illustrate example scenarios of a conversion and merge service.
Figure 5B:
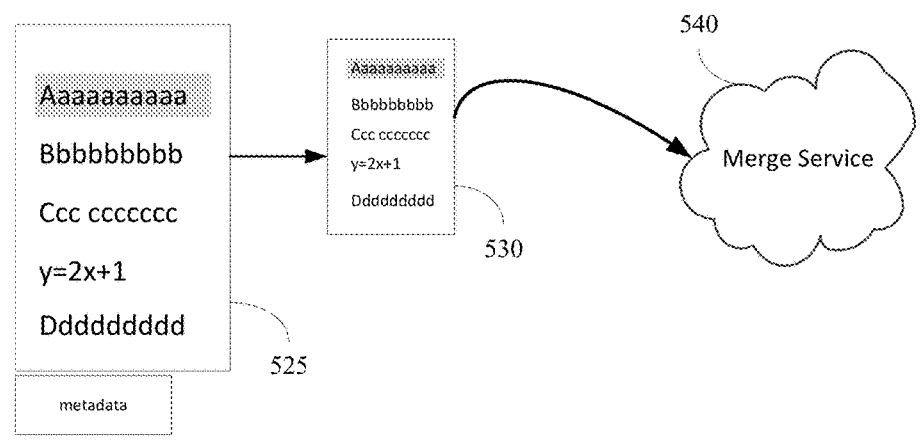
Figure 5C:
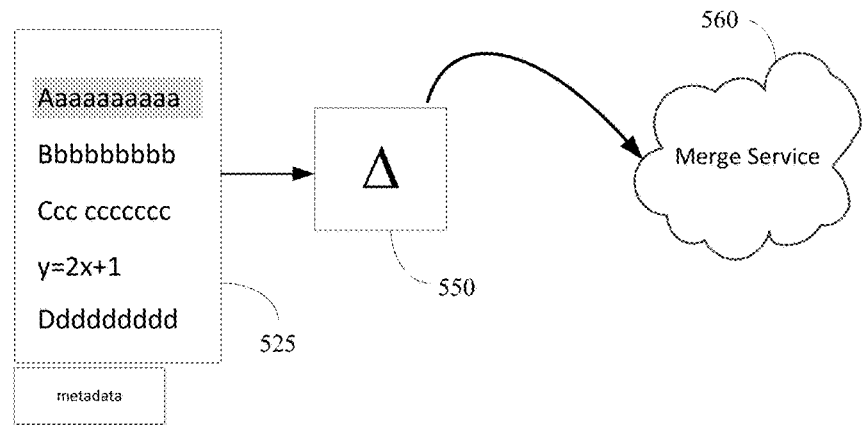
Figure 5D:
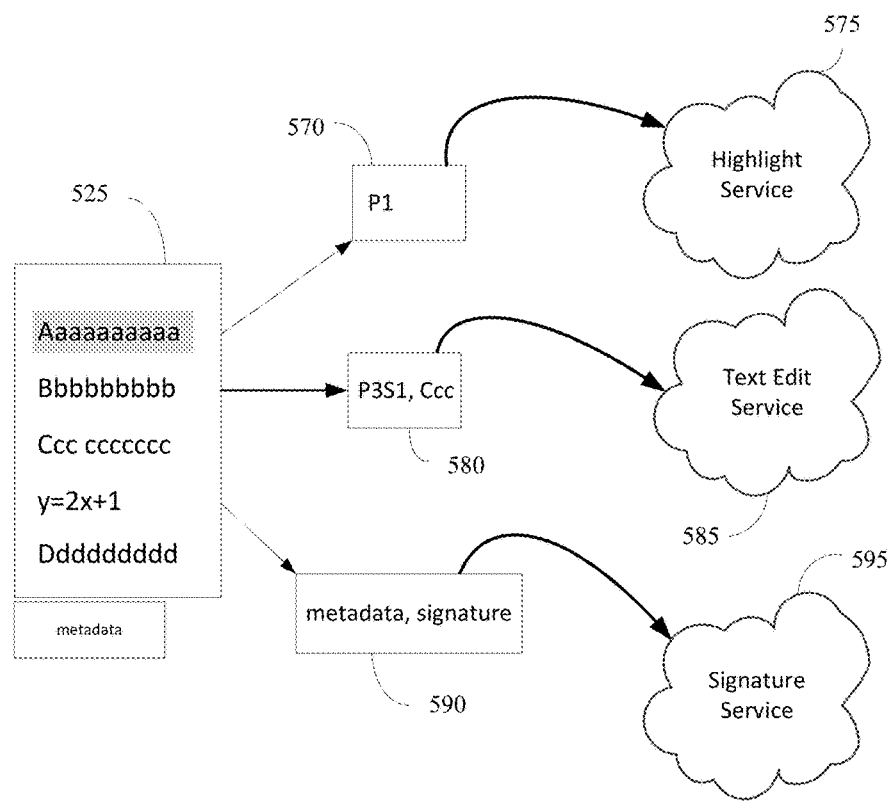

FIGS. 5A-5D illustrate example scenarios of a conversion and merge service. Referring to FIG. 5A, a conversion service 505 can access a document from a database 510 and serve the document to a client in a supported file format, for example as displayed document 520. The actual format for the content of displayed document 520 (as stored in database 510) may include, but is not limited to, PDF, DOC, DOCX, and ePub; however, the conversion service 505 can provide the content in a format supported by the client- and even customized for the endpoint.

To access the document from the database, the service receives the address or resource identifier of the document and retrieves or requests the document at the address location.

Embodiments provide a system in which documents are presented to a user as if they are in the format needed for a particular client—even if the document does not actually exist in that format or version until the time that the user selects the document for viewing (or editing). Instead of pre-converting all files stored on the server to every type of file format, a particular format for a document is delivered upon request by a user.

Embodiments can extend the reach where content can be consumed and create an experience for that content suitable for the device (or client) on which the content is provided. The service can interpret the device and capabilities to determine what is a desired or suitable way to view the content on the particular device. Features that the service can take into consideration include, but are not limited to dimension of a display, user input capabilities of the device, speed and/or bandwidth of a network connection, as well as operating system and application constraints.

For example, some documents may look great displayed on a laptop, but not quite as useable on a smaller screen such as on a phone or tablet. By determining what the client is (such as determining the consumption format appropriate for the client), the service modifies the consumption experience based on the device (or software).

At the client, the document 520 provided by the service 505 may be edited. In the instant example, an edited document 525 (see FIGS. 5B-5D) may be merged back to the master document to facilitate collaboration across different editors and feature versions. To provide the merge services, a general API or a plurality of APIs for collaboration and merge services can be used. The APIs enable clients to merge changes to a document across multiple platforms. In addition, the services can be extensible to a third party adapter in situations where an intermediary conversion to a recognizable file format may take place, for example where a proprietary or new format is developed.

FIGS. 5B-5D show various scenarios of merging an edited document 525 back to a master document.

FIG. 5B shows a case where the entire document with modifications 530 is provided to the merge service 540. Referring to FIG. 5B, a general API can be used. In one embodiment, a client can send the whole document up to the server (e.g., services 540) with the changes (as document 530). The service 540 interprets the document 530, determines the differences, and then automatically merges. The merging can be carried out even when the edited document is of a different file format from the master document. The document 530 can be converted to a particular format by the service 540 to facilitate the merge.

FIG. 5C shows a case where the differences (the delta 550) between the document 520 (as shown in FIG. 5A) and the edited document 525 are provided to the merge services 560 (via a general API). The service 560 interprets the delta 550 and automatically merges. The merging can be carried out even when the edited document is of a different file format from the master document.

FIG. 5D shows a case where a plurality of APIs are used. The APIs can be bundled as part of a lightweight option for merging content. The APIs can be individual modification functions and may include, but are not limited to, a highlighting API, a font API, a paragraph API, a styles API, a translate API, an equation API, a table creation or editing API; an image insertion, creation, or editing API; a color API, a comment API, and the like. One or more of the APIs may be available to a particular client.

For example, a client can call the highlighting API and pass through a paragraph identifier or the text and the service performs the highlighting. A client can call the comment API and provide the sentence, paragraph, or word where a comment is to be inserted along with the text to insert as the comment. The device does not need to understand the file format of the document. For example, the document may be stored as a DOCX file, but the client is viewing (and editing) the document as a PDF file or an ePUB file.

According to another embodiment, a client can call a comment API, which may provide commenting services. Commenting services (via, for example, a comment API) can enable limited endpoints to send comments on parts of a document into the service for merging into the full document. The commenting services can receive the comments and an indication as to what part of the document the comments are associated and then modify the full document to include the comments.

In a further embodiment, the comment itself can be assigned an address and then used by other clients, for example, in a subscribe scenario (where a client or server receives a notice of when someone comments on a post, message, or other document and/or receives or can obtain the comments).

In the example shown in FIG. 5D, the edited document 525 includes a highlighting of a first paragraph, a correction to text in the third paragraph, and a signature added to the metadata associated with the document. For the highlighting API, the client can invoke a highlight API and pass the paragraph identifier 570 to the highlight service 575. To correct the typographical error, the client can pass a location identifier (e.g., third paragraph, first sentence) and the replacement text 580 to the text edit service 585. For adding a signature, the client can pass the location identifier (e.g., metadata) and the signature 590 to the signature service 595.

A location identifier can include, but is not limited to, a paragraph identifier that identifies a paragraph in a document, a line identifier that identifies a line in the document, a character identifier that identifies a character in the document, and a part identifier that identifies a part of the document. The part identifier can provide a location identification that differentiates between parts of the document such as document content, comment content, style content, and the like. The parts of the document identified by the part identifier may also be structurally delineated content within the document. In one embodiment, the part identifier identifies a part of the document being modified through structural markup with associated metadata. An example of structurally delineated content is as follows:

This is a paragraph.
<fill-in region> Here is some content that a user may edit and then send back to the server to merge </fill-in region> Following paragraph.

In the above example, which has an appearance of a content control, the content that can be modified by a user is located in the paragraph between the identified "fill-in region" markup. In some embodiments, the part of the documents at which the modification is to take place can be identified through the structural mark-up in the document, for example as the "fill-in region".

In some embodiments, content from a client supporting a plain text file format can add rich content to a file through the service by passing through text and calling an API that can take the text and add the specified formatting. Similarly, content can be added to metadata by invoking a service adding the content to the metadata.

Figure 6:
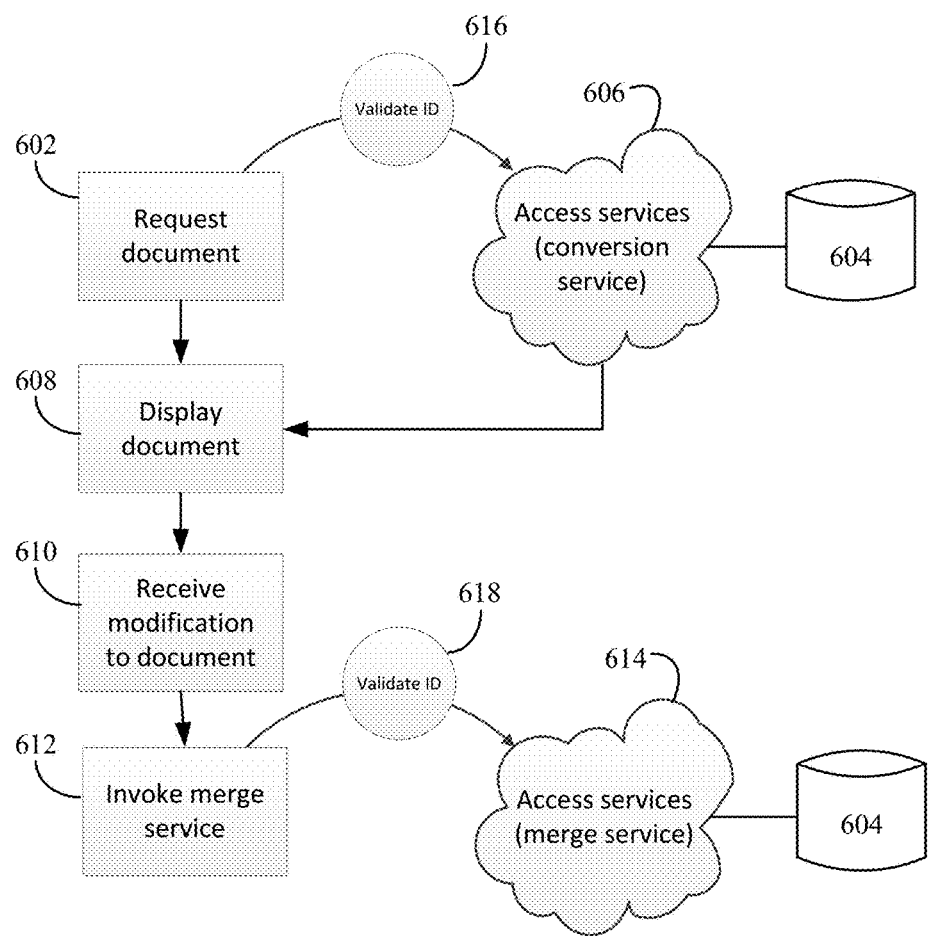
FIG. 6 shows a diagram of a process carried out by an editor according to an embodiment of the invention.

FIG. 6 shows a diagram of a process carried out by an editor according to an embodiment of the invention. An editor refers to a client (hardware or software) that includes tools for editing text, images, or sound. The editor may be a productivity application, including word processing applications.

Referring to FIG. 6, at operation (602), the editor can request a document. The request may be to open a file located on a cloud database 604. Because the document may not be in the same file format as supported by the editor, the request for the document can invoke an access service 606 providing a conversion service. The access service 606 can retrieve the document from the database 604 and convert the document into a suitable file format for the editor. In operation (608), the editor can receive the converted document from the access services 606 and render the received document for display.

The document retrieved from the database 604 may be a master document. During the course of using the editor, a user may modify the received document. When a modification is made to the received document (610), the modification may be merged into the master document by invoking a merge service (612).

Invoking the merge service (612) calls a merge service of an access service 614. The invoking of the merge service may occur as a response to receiving a save command from the user. In another embodiment, the invoking of the merge service may occur as part of a workflow. For example, the invoking of the merge service may be triggered by certain events, such as an automatic save from the system.

Optionally, validation processes (616, 618) may be included to provide access to the document and/or the access services based on a user's identification. For example, an OATH token may be used to validate a signed-in user against the access services (606, 614). The token may be sent by the editor to the cloud database and/or the access services so that the user can be authenticated and the document accessed.

Further embodiments may utilize an identity manager to facilitate the service knowing who the user is and what documents the user cares about. By knowing the identity of the user, the service can retrieve the user's content (e.g., documents) across multiple devices (e.g., the user's computer, laptop, tablet, smartphone, ebook reader and the like) and services (e.g., file hosting services such as the DROP-BOX service from Dropbox Inc. and the MICROSOFT SKYDRIVE service from Microsoft Corp.)—on the user's behalf.

In addition, by knowing the client on which the document is to be provided, the system can take the document in one format and convert the document into a customized format for a client being used by the user. For example, a user may be working on a document in MICROSOFT WORD and would like to access the document on her ebook reader. In one such case, the service can present the document to the user when the user browses available files from her ebook reader (e.g., so the user can read it on the ebook reader). This can remove the steps a user currently takes to send a document to an ebook reader (in order to have the document converted to the appropriate format).

The file may be available upon opening of an app on the reader device. The app can have an associated hub of documents that can run on the reader. In another embodiment, a service provided by the reader, such as provided by Amazon.com for the Kindle reader can integrate the user's experience via an extensibility layer in order for their users to access documents from the access services of certain embodiments of the invention.

According to an embodiment, the user can simply work on the document, save the document (or an address of the document), and close the file. By the identity manager knowing who the user is and then what platform to which the document is to be made available, the document will be there for the user in the appropriate format when accessed again by a same or different client.

Figure 7:
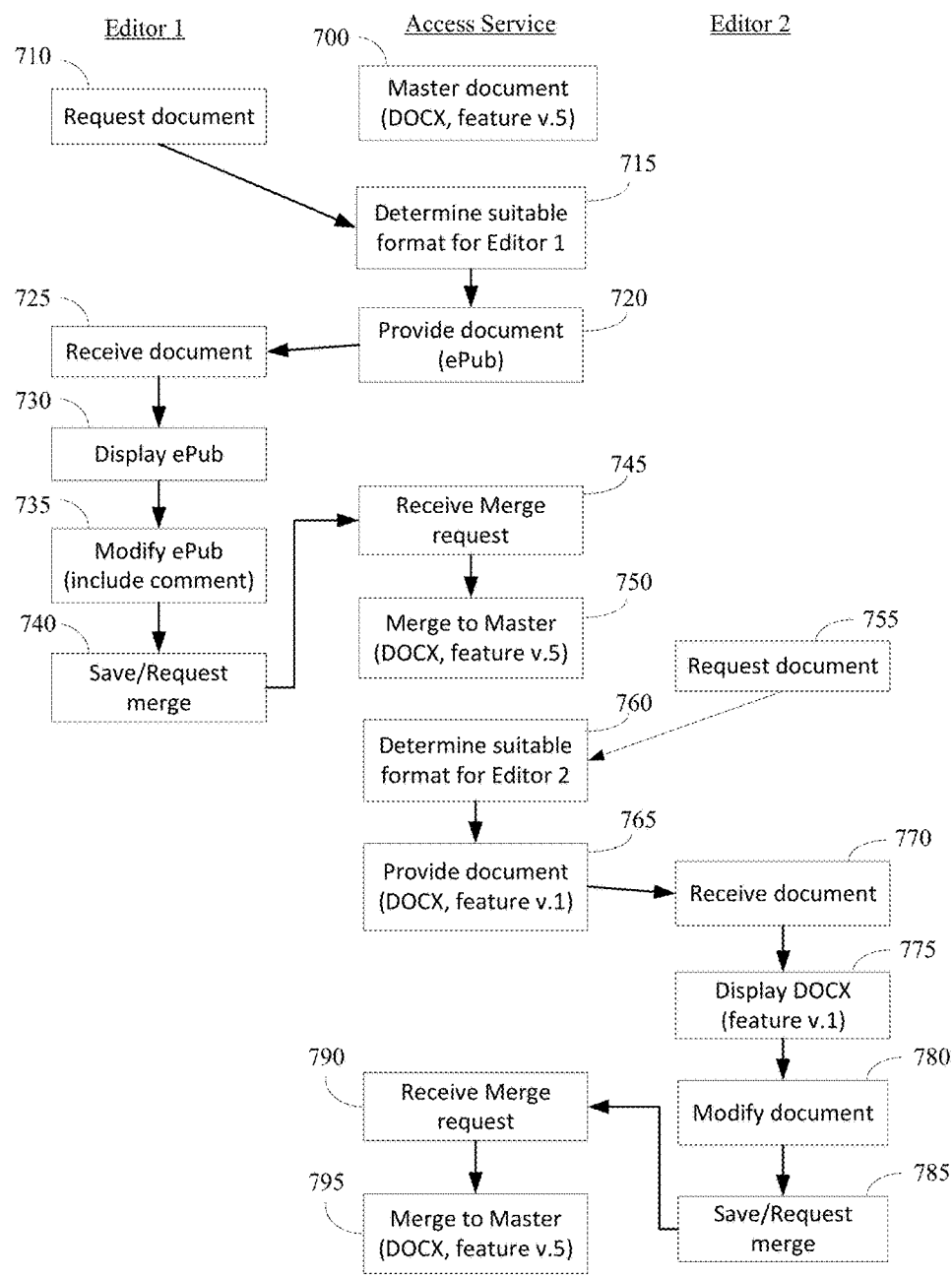
FIG. 7 shows a process flow diagram of a method for collaborating on documents using multiple editors according to an embodiment of the invention.

FIG. 7 shows a process flow diagram of a method for collaborating on documents using multiple editors according to an embodiment of the invention. A method of collaboration can be based on a master document 700 managed by an access service. A first editor (Editor 1) can request, at operation (710), the document 700 from the access service. The master document 700 may be stored in a database associated with the access service or be retrieved from a known location by the access service. In this example, the first editor may be a reader that supports an ePub format and the master document is in a DOCX format. The access service can determine a suitable format for the first editor (715) and provide the document to the first editor (720). Because the first editor supports the ePub format and not the DOCX format of the master document, the service can provide the document to the first editor in ePub format.

The first editor can receive the ePub format document (725) and display the document (730). A user of the first editor may modify the ePub document (730), for example, by including a comment. When a save command (or other specified condition) occurs, the first editor can request a merge from the access service (740). The request may include the entire ePub document with modification (e.g., the document and the comments) or a location identifier for the modification and the modification (e.g., the location for the comment and the text to be added as a comment).

The access service can receive the merge request (745) and perform operations to merge the modifications to the master document (750). The master document can remain in its original format and version.

A second editor can request the document from the access service (755). In this example, the second editor may be a computing device that supports DOCX file extensions, but at a different feature version than that of the master document. As an illustrative example, the master document may be at version 5, but the second editor may be at version 1. Moving to operation (760), the access service can determine a suitable format for the second editor, and provide the document to the second editor (765). The second editor can receive the DOCX (feature version 1) format document (770) and display the document (775). A user of the second editor may modify the document (780). When a save command (or other specified condition) occurs, the first editor can request a merge from the access service (785).

The access service can receive the merge request (790) and perform operations to merge the modifications to the master document (795). The modification may be to a portion of the content using a feature supported by both versions. Because the second editor supports the older version of DOCX but not the newer version, fidelity rehydration to the newer version can be accomplished by using the service—and the content using the newer features will note be destroyed by the merging.

If the modification is to a portion of the content using a feature not supported by both versions, the conflict may be resolved by any suitable manner including changes made on behalf of the users and changes made in response to a decision by a user. For example, in some cases, decisions by the service may be made with respect to how, where, and whether to incorporate the modification. For cases where a decision is not able to (or not set to) make a decision, the service may provide one or more devices the option to see all conflicts and possibilities. Users can then choose an option for resolving the conflict.

The access service enables multiple editors to view and edit a same file. Moreover, the second editor and the first editor, while both accessing the master document, are accessing the document across different platforms.

According to embodiments, the file can be a "document" including portions (referred to herein as "blocks") that a user can see as content and which are individually addressable. These individually addressable blocks can include text, paragraphs, collections of paragraphs, tables, objects, pictures, charts, audio, images, and various other units and collections. According to certain embodiments, each block and/or collection of blocks can be individually addressable. Further, each individually addressable block of a document can be converted and merged using the conversion and merge services. In some cases this can be helpful when a user edits a portion of the document in a format that may be different than how the document would be stored.

One or more text blocks (separate from or combined with formatting) and/or images may be combined and presented to a user in a document view.

Figure 9:
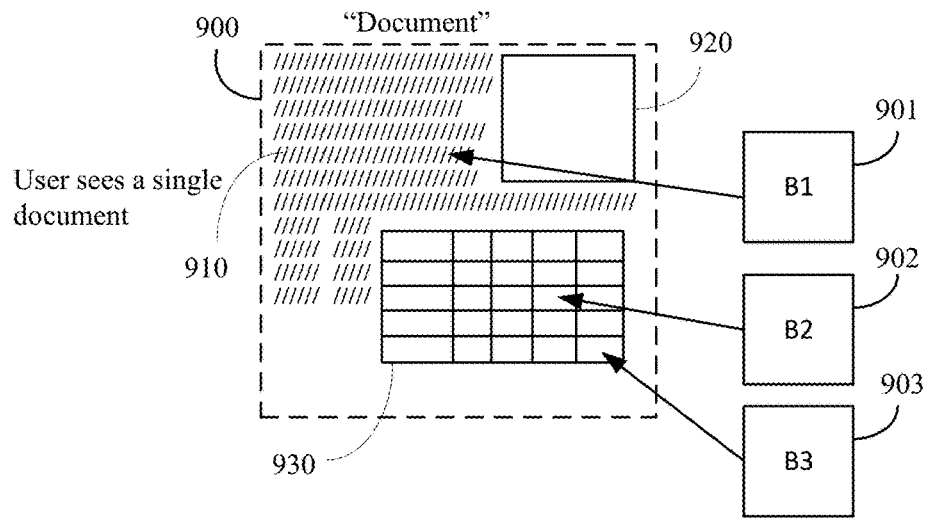
FIG. 9 shows a diagram of a document view having addressable content blocks according to an embodiment of the invention.

FIG. 9 shows a diagram of a document view having addressable content blocks according to an embodiment of the invention. As illustrated in FIG. 9, a user sees a single document—"document" 900, which is made up of content blocks (such as B1 901, B2 902, and B3 903). The content blocks may be combined into what appears as a cohesive document even though at least two of the components may be obtained from different services or resource locations.

In the example shown in FIG. 9, a document view 900 can include text 910, an image 920 and a table 930. Some of the content in the document view 900 may be separately addressable (and may have been obtained from different services or resource locations by the access service or other service providing the document). For example, a sentence or paragraph in the document view 900 may include content from addressable as content block B1 901; and a table 930 may include one or more independently addressable cells in which content from content blocks B2 and B3 902, 903 may be included.

In certain implementations, the document view can include a shared block view in which the sub-blocks making up the document view can be visualized within the document view. The visualization may be illustrated through highlighting, font color, comment, or other differentiation by which a user can determine that a portion of the document view was obtained from a shared block or obtained from different addresses.

Figure 10:
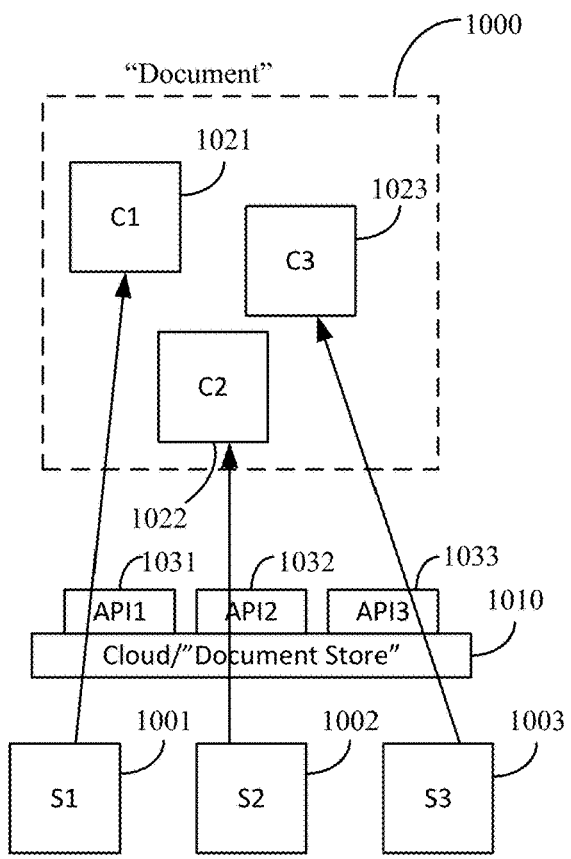
FIG. 10 shows a diagram of a system for content curation according to an embodiment of the invention.

FIG. 10 shows a diagram of a system for content curation according to an embodiment of the invention. Referring to FIG. 10, a user can view, as a cohesive, single document 1000, content retrieved by a content access service from a plurality of resources and/or services (1001, 1002, 1003). According to an embodiment, a user may access a document 1000 using an access service that presents the document 1000 as being a single document available in an appropriate format for the user's device. When presenting the document 1000, the access service may retrieve multiple components from a document store 1010.

For example, a client may request a document that includes content to be retrieved from multiple resources. In such a case, corresponding API calls to retrieve the pieces of content can be made to the different resources (or services). Although the user "sees" a first content block C1 1021, a second content block 1022, and a third content block 1023 as a single document 1000, the cloud (or document store) "sees" the three sub-components retrieved from respective resources or services 1001, 1002, and 1003 through API1 1031, API2 1032, and API3 1033.

The access service may respond to receiving a request for a document by obtaining the appropriate sub-components C1 1021, C2 1022, and C3 1023 from the document store 1010 and arranging the sub-components in an appropriate format for viewing at the client.

Portions of a document can be individually addressable. Instead of emailing a document or providing an entire document to another person when the other person is to review or comment on only a portion of the document, a user can send that person a link to the specific parts of the document that are to be reviewed or commented. The service can be used to request an address (and URL) for the specific parts of the document; and, once the user receives the address, the user can send the address to the other person. When working within a view of the document, the user can select a section and request an address to be created.

In one embodiment, once the address is obtained, it is this address that can be passed around to people and systems to get data back, for example in the form of a URL.

In some embodiments, the address can be returned to the client as a link or other form presenting a URL for the block. According to various embodiments, the address service can be embodied on one or more servers and access one or more databases and/or data warehouses. The address service may be implemented as an XML Web service with a SOAP API.

According to certain embodiments, a URL can be created to enable access to the content at the address created by the service. The URL that returns the content block may include a GUID for the block. In some embodiments, an output file type can be included to indicate the format in which the block is stored.

By accessing the URL via, for example a GET HTTP request, the data at the address may be obtained. The URL can be used by $3^{rd}$ parry services to provide certain content to subscribers.

Once the address is created, data can be retrieved using the address. The data can be in native XML, canonical HTML or text. A "canonical" link refers to a preferred version of a resource. A canonical link relation specifies a preferred internationalized resource identifier (IRI) from a set of resources that return the context IRI's content in duplicated form (i.e., the IRI that is preferred over resources with duplicative content).

Figure 11:
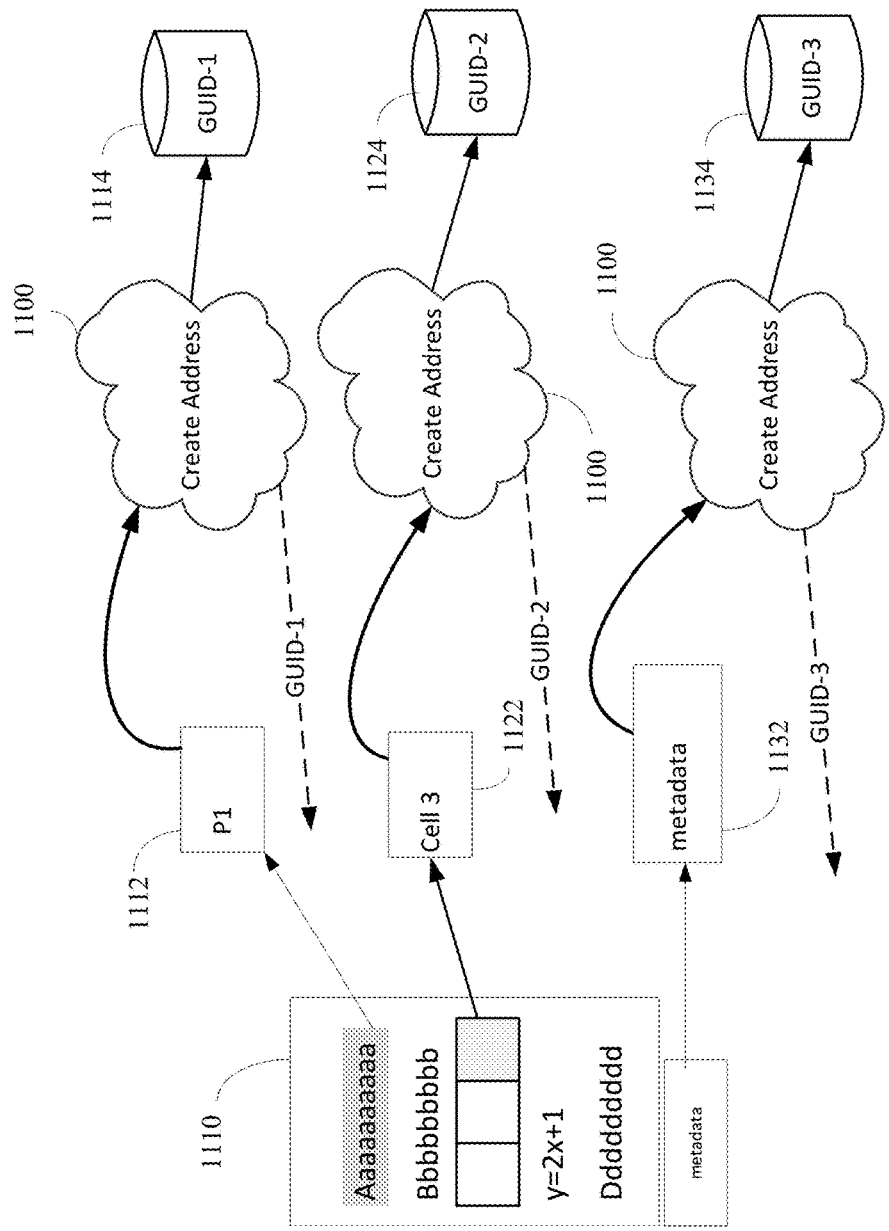
FIG. 11 illustrates an example scenario of creating new addresses for sub-sets of content of a document.

FIG. 11 illustrates an example scenario of creating new addresses for sub-sets of content of a document. Referring to FIG. 11 a create address API 1100 can be called to create an address (e.g., a GUID) for a content block of a document view 1110 identified via, for example, a location identifier. The location identifier can include, but is not limited to, a paragraph identifier that identifies a paragraph in a document, a line identifier that identifies a line in the document, a character identifier that identifies a character in the document, and a part identifier that identifies a part of the document. The part identifier can provide a location identification that differentiates between parts of the document such as document content, comment content, style content, and the like. The parts of the document identified by the part identifier may also be structurally delineated content within the document.

Once the create address service generates the GUID, the GUID can be returned to the client as metadata associated with the content block.

A URL passing the GUID can be used to access this content block. In some cases, the document view can utilize this new content block address when displaying the content of the document.

When a content block is updated by one client, a document formed of this block and viewed by another client can be updated. In some scenarios, the update may appear simultaneous in that as the content block is updated at one client, another client viewing a document including that addressable content block may see the changes as if they are being performed locally. In some other scenarios, a user may control when the updated block is shared (and available to others accessing that addressable content). This can be accomplished, for example, by storing a version into the URL and sending a pointer to the specific version of the document. For example, a user can send a draft version for review and keep working on the latest versions. People receiving draft version will not see the changes until the latest version is shared through sending an updated pointer.

In one example, a client can call the create address API 1100 and pass through a paragraph identifier 1112 or range (and in some cases the text or image), and the service generates (and stores) the GUID-1 1114 for the paragraph or range. In some cases, when text or images are provided, the service can generate an address as if a paragraph identifier or range was submitted.

As another example, a client can call the create address API 1100 and pass through one or more cells of a table 1122 to have the service generate (and store) an address (e.g., GUID-2 1124) for the one or more cells of the table. In one scenario, such a content block can be accessed by a spreadsheet client for use in calculations. In another scenario, an address specific to a cell content block having a graph or mathematical function total (such as created by a spreadsheet application) may be used to provide this content in a blog or as part of a word processing or presentation document.

As yet another example, a client can call the create address API 1100 and pass through metadata 1132 to obtain an address (e.g., GUID-3 1134) specific for the metadata. Of course, metadata may be included in one or more blocks of other location identified content. One scenario where metadata may be useful when accessed via an independent address is for version information or signature information. This metadata may be later accessed to show collaboration history of a document. In some implementations, when later accessed, the history data can include a list of versions for a block identified by the URL and the content associated with a specific version.

Rights management can also be implemented for an addressable block. For example, when a client calls a create address API, information about who can access, edit, view, and share can be passed with the request and such information can be stored by the server, for example as metadata, to be checked against when the content at the address is accessed. This can be used to control access or permissions to a range or other identifiable part of a document. In one scenario a block can include controls for access by specific users or roles (such as assigned by a rights management system). In another scenario a block can include permissions such as whether a portion is read-only. In a further scenario, both the access and permissions can be included so that users with various roles may have various corresponding permissions.

Figure 12:
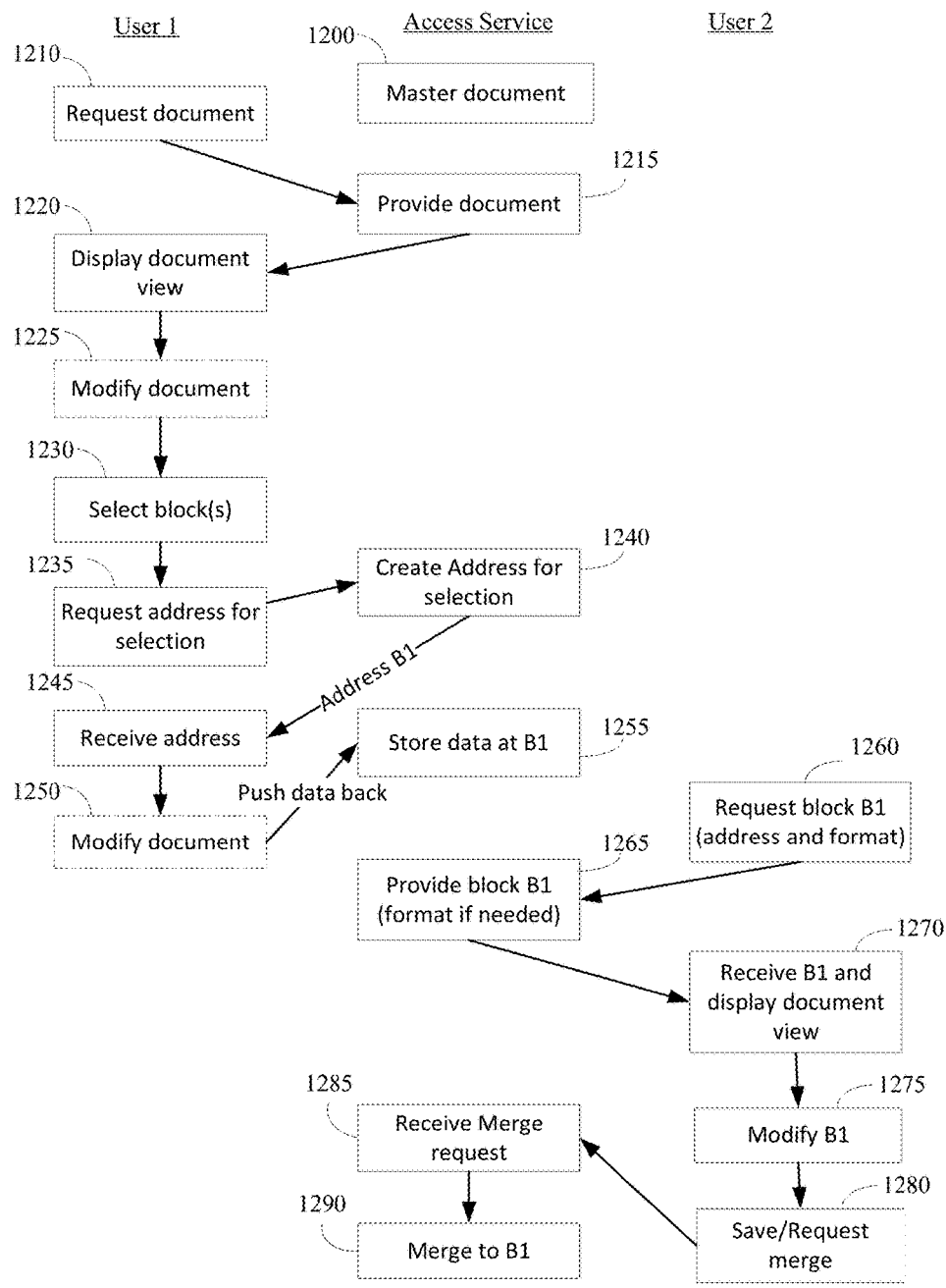
FIG. 12 shows a process flow diagram of a method for collaborating using sub-sets of content created from a document.

FIG. 12 shows a process flow diagram of a method for collaborating using sub-sets of content created from a document. Referring to FIG. 12, a master document 1200 can be managed by an access service. A first client (User 1) can request, at operation (1210), the document 1200 from the access service. The master document 1200 may be stored in a database associated with the access service or be retrieved from a known location by the access service. In response to the request from the first client, the access service can provide the document to the first client in a suitable format (1215).

The first client can receive and display the document (1220). A user of the first client may optionally modify the document (1225), for example, by changing a typographical error in a line of text, adding a comment, or performing some other editing function. While viewing the document, the user can select one or more content blocks (1230) and request an address for the selection (1235) from the access service. The request can include a location identifier and/or the content selected by the user.

The access service can receive the address request and create an address for the selection (1240). The selected block(s) (or its location) may be stored in a data store by the access service and the address for the block(s) provided to the client. The client receives the address (1245) and can include the address for the block in the metadata of the document. Modifications (1250) may be made to the document including the sections having the newly assigned address and the data in the block (along with modifications, if any) may be pushed back onto the server and stored by the access service at the address B1 (1255). Although not shown, the original document (and/or modifications to that document) may also be merged back to the master document 1200 with the master document remaining in its original format and version.

A second client (User 2) (who may have been given the information about the created content block B1) can request the content at the address B1 (1260). The request to the access service may include both the address and a desired format for the content. In some cases, the access service can determine the format for the content by other methods. The access service can provide the content block B1 to the second client in a suitable format (1265). The second client can receive the B1 content and display the content in a document view (1270). The second client may display the content block, alone, as part of another larger document also accessed by the access service, or as part of another larger document generated or created by the second client. A user of the second client may modify the document, including the content block from B1 (1275). When a save command (or other specified condition) occurs, the second client can request a merge from the access service (1280).

The access service can receive the merge request (1285) and perform operations to merge the modifications to the content block at address B1 (1290).

Figure 13:
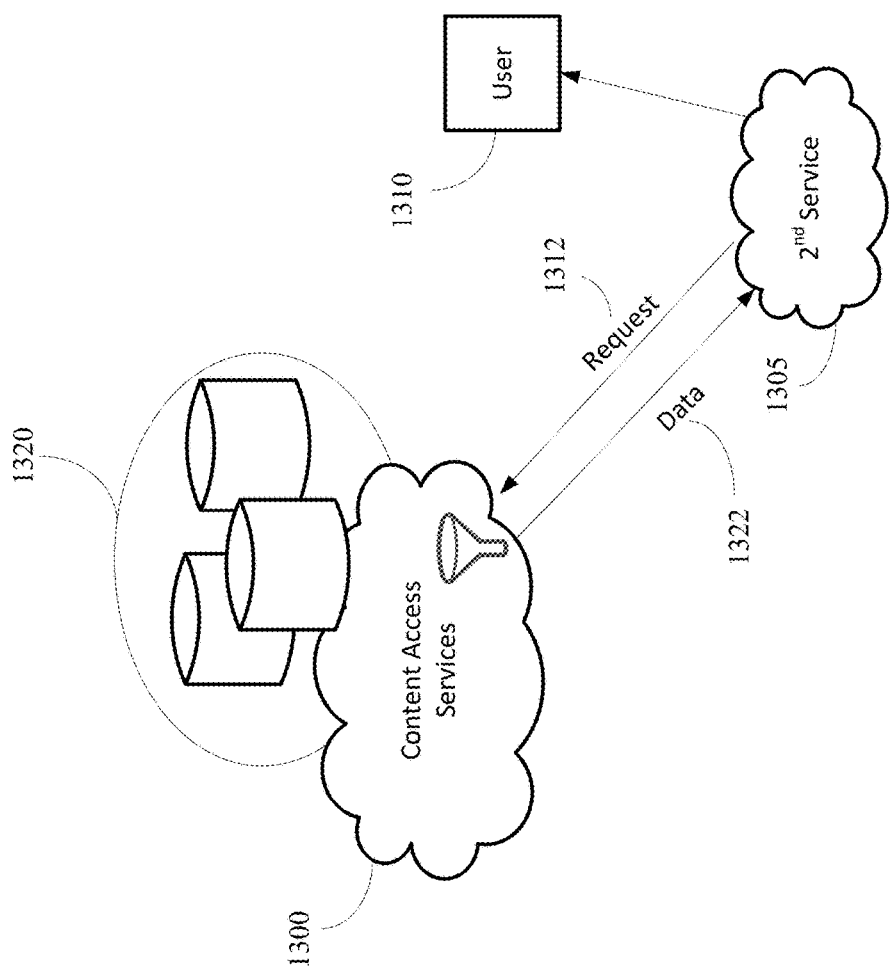
FIG. 13 shows a diagram of an operating environment illustrating an example embodiment.

FIG. 13 shows a diagram of an operating environment illustrating an example embodiment. Content access services 1300 may provide an extensibility layer on the cloud that a third party (or same party) provider (of a second service) may integrate into their user's experiences.

For example, a second service 1305 can call the content access services 1300 with a request 1312 for a particular file portion. The file portion may be retrieved from a document store 1320 accessible by the content access services 1300 or hosted on the cloud. In response to receiving a request 1312, the content access services 1300 may return a document block of data 1322 to the second service 1305 in a format suitable for the second service 1305. The format of the data 1322 may be converted by the content access services 1300 or provided as-is to the second service 1305. The second service 1305 may provide the content to the client 1310. In some embodiments, the request can include multiple requests and/or resources. Once the data 1322 is received by the second service 1305, the data 1322 may be combined and provided in any suitable manner to the user 1310.

For example, the second service 1305 may be a content access service to which a user subscribes or utilizes in some other fashion to receive content including content curated by the user or by others.

Figure 14:
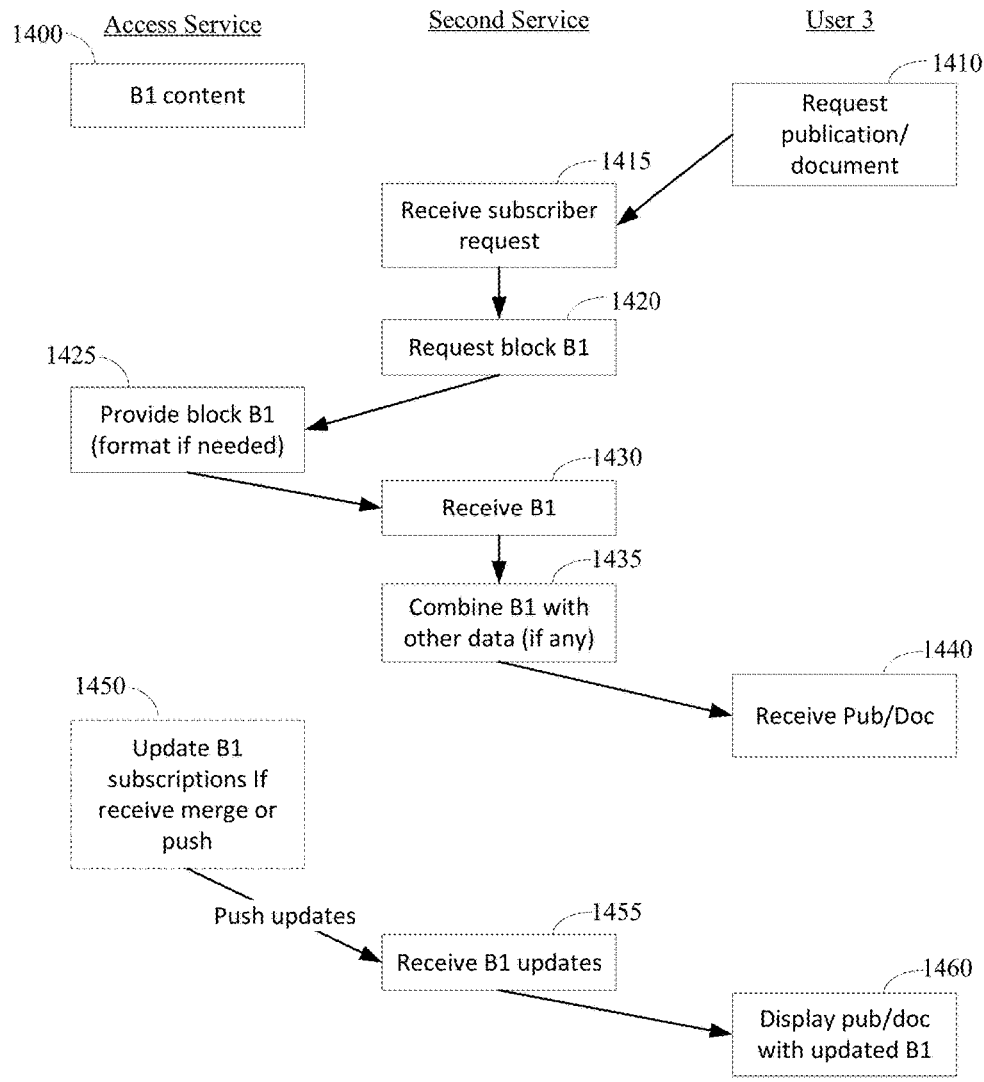
FIG. 14 shows a process flow diagram of a method for accessing curated content.

FIG. 14 shows a process flow diagram of a method for accessing curated content. A content block 1400 can be managed by an access service. The content block 1400 may be stored in a database associated with the access service or be retrieved from a known location by the access service. A client (User 3) can request, at operation (1410), a publication/document from a second service, which may be a subscription service. This publication/document can include curated content. The second service can receive the subscriber request (1415) and then request, at operation (1420) the content block 1400 from the access service. The access service can provide the document to the second service in an appropriate format (1425). Once the second service receives the content block (1430), the content block B1 can be combined with other data that may be requested or generated by the second service (1435). The publication/document can be received by the client (1440).

Notification services can be utilized to push updates to content out to subscribers. Alternatively, content can be periodically refreshed or refreshed upon receipt of a notification that a change has been made.

By creating addresses for content blocks (e.g., creating an addressable entity or object), it is possible to get named object(s) from a server, view and/or edit a customized view of the named object(s), and utilize services to handle merging and conversion issues.

The following example scenarios are presented to provide a greater understanding of certain embodiments of the present invention and of its many advantages. The following example scenarios are simply meant to be illustrative of some of the applications and variants for embodiments of the invention. They are, of course, not to be considered in any way limitative of the invention.

Example Scenario A:

A user of a KINDLE reader or a NOOK reader is reading a document and would like to contribute to the document—either by commenting, correcting a typographical error, highlighting, or performing some other modification or annotation. These readers have some editing capabilities—even though the readers are not primarily editors. Accordingly, certain embodiments of the invention allow a user to take advantage of the reader's abilities, for example the annotations and editing capabilities and then merge those modifications back into the document. Instead of each device or application having to contain co-authoring capabilities, the "document-as-a-service" merge services can automatically merge the edits/content back into the document—even from disparate platforms.

In one embodiment, the merging can be accomplished when the reader performs a synching operation (such as used to enable a user to read digital content across multiple devices while picking up the digital content from the farthest location achieved). In one such case, during the call to update location to a synchronizing service, modifications to a document can be sent to a conversion and merge service of an embodiment of the invention.

In another embodiment, the reader can call the conversion and merge services upon an active step by the user, for example, when the user elects to save the document. In yet another embodiment, an auto-save feature can be used to save the changes.

Because clients are not required to include a layer that can understand and perform co-authoring, devices can be "dumber" or focus device resources on other applications and functions.

Example Scenario B:

A document may be created in a DOCX format for a recent version of the MICROSOFT WORD document and word processing software available from Microsoft Corp., but the author would like to view, and perhaps comment or edit the document on a reader such as the NOOK reader, which may use an ePub file format, or the AMAZON KINDLE reader, which may use a proprietary AZW and KF8 format. By using the service, the person can access the document in the appropriate format for the NOOK reader or the KINDLE reader and then make changes to the document, for example by adding some comments. The comments can be saved back into the master file, which in this case is the DOCX file format.

Example Scenario C:

Currently, opening a MICROSOFT WORD document file in a different version than that used to create the document can result in the document not displaying all the features. For example, certain fonts or formatting may change and rich or complex features may disappear, for example, footnote capabilities and some macros. In some cases, the change in version is also a change in file format, such as with the case of MICROSOFT WORD 97 (which uses the DOC file format extension) and MICROSOFT WORD 2010 (which uses the DOCX file format extension). In other cases, the change in version provides additional functionality and/or features such as with the case of MICROSOFT WORD 2007 and MICROSOFT WORD 2010.

Fewer issues may arise when the document is created in an older version and then opened in a newer version, but there may still be errors where a feature is phased out or not fully supported in a later version. In addition to issues with displaying a document created in a different version than that used to open the document, when a document created in a later version is opened and saved in an earlier version, the later version features may be lost—even when the document is reopened in the later version. For example, the MICROSOFT WORD 2010 word processing application includes features for creating and manipulating graphics. If a document was created in MICROSOFT WORD 2010 with fancy graphics, but is opened in MICROSOFT WORD 97 to correct a typographical error in some text on a first page of the document and then saved, the saved document reverts to the older version (with file format extension DOC)—losing the fancy graphics. Just because one word is changed, the entire document reverts to the older version of the graphic images.

According to certain embodiments, the user's intentional change in the older version can be recognized and merged into a document supported by the new version in a manner that retains the newer features.

Example Scenario D:

By using the content access services, content can be tailored to older versions of existing products. For example, a user may be able to delay upgrading to a newest version of a software application or require that a next version be backward compatible in order to read older/newer file format extensions because the file the user (running the newest program and vice versa) will receive can be tailored based on the endpoint.

For example, a client running MICROSOFT OFFICE 2013 may receive a full view with all features available, but when the same document is opened from a client running MICROSOFT OFFICE 2007, the service may package the content for consumption view but optimized for MICROSOFT OFFICE 2007. The optimization can include replacing certain features with those of the appropriate fidelity. As an example, an equation editor provided in one version may not be backwards compatible. Therefore, the service may replace the equation in the document package with an image of the equation or with a form that is editable in an equation editor suitable for the version in which the document is provided.

A similar experience can be provided for other productivity applications, including word processing applications. For example, a client running MICROSOFT OFFICE 2013 may receive a full view with all features available, but when the same document is opened from a client running another productivity application such as GOOGLE DOCS available from Google Inc., APACHE OPENOFFICE available from the Apache Software Foundation, or ZOHO OFFICE available from Zoho Corporation, the service may package the content for consumption view but optimized for GOOGLE DOCS, OPENOFFICE, or ZOHO OFFICE.

Example Scenario E:

A master file may be stored in a highest fidelity format. For example, a master document may be stored a most recent version of MICROSOFT WORD. A client running an earlier version of MICROSOFT WORD can be served a file in a DOC format instead of a DOCX format. When a user makes changes to the DOC document and saves the document (either as part of an auto-save or by an active step), the changes to the DOC document are saved back into the master file in the DOCX format. In one embodiment, the entire DOC document is rehydrated to the DOCX format at the server. In another embodiment, only a portion that is modified by the user (and not simply part of the differences made to the content when serving the DOC file to the client) is returned to the server upon save. This portion can then be re-associated by with the full fidelity document.

Example Scenario F:

Embodiments can facilitate forward and backwards compatibility between different versions of a same product. Currently, a file saved in a MICROSOFT WORD program is saved for multiple targets. For example, when an updated feature version for an equation is used in a file and the file saved, the native equation data is saved out (so that it can be read back in with the appropriate fidelity for editing) and a picture of the equation is saved out so that a previous version of the word processor display what the equation looks like—even though the equation editor is not supported. The older version may contain information on how to let the newer version get its full fidelity back. For example, an older version may be in a display mode and not allow for editing.

Each version of the word processor contains information on how to round-trip certain feature so that a future version can get its full fidelity back. A round-trip refers to a document going from one version to another version and then back to the original version. For example, a feature A may be in version X, but in version Y the feature A may be represented as feature A-prime. When feature A-prime is viewed or accessed from version X, then the feature goes back to A. This arrangement puts a pressure on future versions to create down-level compatibility based on how the earlier version can round-trip the feature as well as potentially requiring additional data to be saved.

Embodiments of the invention remove or minimize the pressure on having a version know how to round-trip various features as well as reduce the amount of data saved to support multiple versions. Embodiments enable older versions of a product to read and preserve content from new versions of the product.

Example Scenario G:

Rich Text Format (RTF) is a file format that encodes various documents, text and graphics formatting properties for use as a cross-platform document interchange suitable for many word processing applications. Currently, a RTF file saves multiple separate versions of a picture in a file in order to support potential clients/consumers of the file. For example, one file provides the current version of the picture, a second (or more) file provides one or more previous versions of the picture, another file provides a WORD 2.0 version, and yet another file provides a WORDPAD version. By providing conversion and merge services, a word processing application does not need to support the many file formats or have multiple files of the same content.

Example Scenario H:

Merge services can be applied to automatically merge changes within a document that has been emailed. In such a case, an email service or server can communicate with the merge services. The merge service can manage the merge as if the email service (or email server) was an editor.

For example, a group of people may be collaborating on a document. One of the group may email the changes that person made offline to the others as an attachment to an email. The service and system, knowing the identifier for the document, can merge the changes to a master document on behalf of the user automatically by the act of emailing to a recipient whose email service or email service is configured to communicate with the merge services.

In another example, one of the group of people may email the others using an email account associated with a first email service and attach the document. Some of the recipients may be using a second email service not connected to the first email service. For example the first email service may be the HOTMAIL email service from Microsoft Corp. and the second email service may be the GMAIL email service from Google Inc.

When one of the users of the second email service, which is disconnected from the first email service, edits the document and replies back with the edited document attached, the first email service can merge the changes (which were made offline) back into the master document. When the first email service receives the attachment and identifies the document (and lineage of the document), the first email service can initiate communication with the merge service. The merge service can manage the merge as if the first email service was an editor.

Example Scenario I:

A user may receive a document for review using a device (such as a phone) which may have limited computing power and limited bandwidth (such as due to latency). Currently, if the user would like to comment on the document in this environment—even a single comment or change results in the entire document being transmitted back to a server. According to one embodiment, the access service can provide an accommodation for the limitations of the user's device and incorporate a comment checkbox (of yes or no) that a change is approved. Then, just the indication of the checkbox response can be returned to the server. In this manner, the device got the data it needed from the service and can call the service back to update the comment to approved. The service can take that indication and perform the high fidelity modification and/or insertion of the comment. The user on the limited device believes he/she had whole co-authoring experience but without the price of delivering an entire co-authoring software/technology to the device.

Example Scenario J:

An example of an accommodation of content for a consumer device is a case where the consumer device is a touch enabled device, but the document is not touch-enabled ready. The service can augment the document to make the document more touch-enabled ready by, for example, providing zooming or enlarged features. As an illustrative example, a table in a document originally created on a large screen device but is being provided for rendering on a small screen device can have a touch aspect added that allows the table to get zoomed in (for viewing).

Alternatively, or in addition, by taking the dimensions of a small device into consideration, the service can determine that there is space for only one column out of a three-column table and will present the table in the form suitable for the small screen. This may include adding zooming features or only displaying one column at a time.

Example Scenario K:

A user can specify addressable regions by using a create address API. In an example scenario, a table may be accessed, viewed, and modified in a spreadsheet application. This table may be obtained from a word processing application from which a table was created and made into an addressable region. Once the changes are made in the spreadsheet application, the table may be sent back to the word processing document (converted if needed) and merged. The table may go into multiple documents—once the object is defined (and provided with an address) a change to that object that is pushed back up to the server can be visible in all "documents" that use that object (with that address) as part of the whole.

A user may "freeze" a version of the content by creating a separate address for that version. In some cases, additional permissions may be associated with access to the frozen version.

A user may also provide temporary versions while editing a content block so that changes to the block are updated as the user chooses. In one implementation, this can be accomplished by having a separate push capability in which the user identifies at the client that the user is temporarily saving the changes to the block. In one such case, the service can associate either the previous version or the temporary changes with a pointer.

Example Scenario L:

In one example scenario, an editor can request a document in html. While viewing and/or editing the document provided in HTML, a service can be invoked to create an addressable sub-region. That is, an address service can create an address for a block of content (which may or may not include associated metadata). For example, a request for an address for the viewing page and the data displayed in the viewing page can be requested. For example, the request can define the region as the viewing page and the data within that viewing page can be stored (or associated with) the newly created address. According to embodiments, the viewing page can be further sub-divided and an address created for a particular region. In either case, the client requesting to capture a portion of the viewing page is not required to be able to handle change in data size due to modifications made to the document being viewed. Instead, the client can invoke a create address API, which handles the merging and conversion issues.

For example, a version of a document received by an editor/viewer may present content between the range of character 55 to character 75 of a 200 character string. However, if modifications are made to the document (whether within the range or not), the range retrieved for viewing may not cover the section that a user wants.

By creating an address for the text in the range, if the range changes due to changes in the text associated with the same address, the problem with changed ranges is not an issue because the changes can be associated with an address that can be used to retrieve all the content. In some cases, there can be an implicit understanding by the create address API that an address is requested when a request is made to give the client the text in a particular range.

A range refers to a part of the content of an HTML document and can start and end at any point. Generally, a range object includes the start and end points of a range, enabling copying, deleting, and substituting of content (such as text or HTML elements) within the range. A moniker refers to a nickname or name that can be used to identify and locate one or more objects. HTML may also include anchors and named regions, which can be made addressable through the address services.

Example Scenario M:

A third party (or same party) provider (of a second service or having a web presence) can use the address creation services to provide their own application. For example, a mortgage company (or other vendor) can use the address creation services to provide a web application enabling users of their web application to try different options for obtaining a loan. Variables that could be adjusted by a user for the loan options may include term (e.g., 30 years, 15 years, 7 years), points, total amount, monthly payments and the like. This type of logic can be implemented using a spreadsheet application. If the mortgage company simply provided the spreadsheet to a customer, control of a worksheet of the spreadsheet application implementing such a program may be easily lost. Another option that could be used to implement such a program would be if the mortgage company (or vendor) created their own web application and calculation engine.

Instead of providing a spreadsheet or building a new web application, the mortgage company can leverage one or more of the services described herein to provide the amortization or other lending scenario options. According to an example implementation, a worksheet of a spreadsheet application can be created by the mortgage company and certain cells made available to a customer as part of a customized view to a user. For example, the web application (or webpage) can access the spreadsheet document and present a view to a user based on the portions the mortgage company made addressable. In one implementation, the mortgage company can create a web application that gathers information from a customer, creates a spreadsheet, and populates the spreadsheet with the information gathered from the customer. The "spreadsheet" may be called through a spreadsheet API that creates a worksheet, adds a range to the spreadsheet, and enables updates to the worksheet (or cells or range) (e.g., via an add range API or modify/update range API).

Once the spreadsheet is created, the mortgage company's application can either launch the spreadsheet to allow the user to view and manipulate the data or present the information (for example from an independently addressable total amount cell) in a specifically created user interface. The spreadsheet view or specifically created user interface view can receive input from a user and then call the service to perform the calculations and/or update the results (e.g., through a calculate API or a call to get data from a cell after a merge).

In a further implementation, cells of the spreadsheet associated with certain of the data inputs and calculation outputs may be separately addressable (through using the create address service) and accessed by a word processing or other application to generate a document view that can be used, for example, as a part of a loan application.

Figure 8:
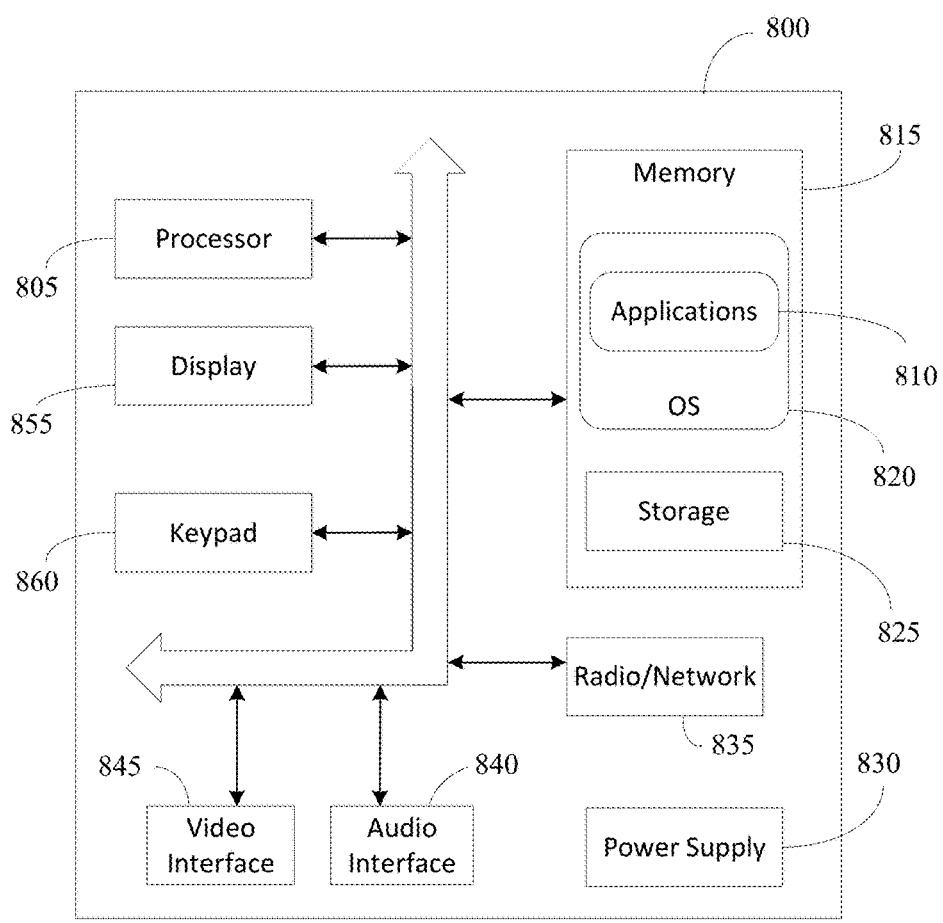
FIG. 8 shows a block diagram illustrating components of a computing device used in some embodiments.

FIG. 8 shows a block diagram illustrating components of a computing device used in some embodiments. For example, system 800 can be used in implementing a client device, editor, or reader in the form of a desktop or notebook computer or a tablet or a smart phone or the like that can run one or more applications. In some embodiments, system 800 is an integrated computing device, such as an integrated PDA and wireless phone. It should be understood that aspects of the system described herein are applicable to both mobile and traditional desktop computers, as well as server computers and other computer systems. For example, touchscreen or touch-enabled devices (included, but not limited to touch-enabled track pad or mouse) may be applicable to both mobile and desktop devices.

System 800 includes a processor 805 that processes data according to instructions of one or more application programs 810, and/or operating system 820. The processor 805 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including Radio/network interface 835).

The one or more application programs 810 may be loaded into memory 815 and run on or in association with the operating system 820. Examples of application programs include phone dialer programs, e-mail programs, PIM programs, word processing programs, spreadsheet programs, Internet browser programs, messaging programs, game programs, and the like. Other application programs may be loaded into memory 815 and run on the device, including various client and server applications.

It can be understood that the memory 815 may involve one or more memory components including integrated and removable memory components and that one or more of the memory components can store an operating system. According to various embodiments, the operating system includes, but is not limited to, SYMBIAN OS from Symbian Ltd., WINDOWS MOBILE OS from Microsoft Corporation, WINDOWS PHONE OS from Microsoft Corporation, WINDOWS from Microsoft Corporation, PALM WEBOS from Hewlett-Packard Company, BLACKBERRY OS from Research In Motion Limited, APPLE IOS from Apple Inc., and GOOGLE ANDROID OS from Google Inc. Other operating systems are contemplated.

System 800 also includes non-volatile storage 825 within memory 815. Non-volatile storage 825 may be used to store persistent information that should not be lost if system 800 is powered down. Application programs 810 may use and store information in non-volatile storage 825, such as a record of commands executed during the creation or modification of content in a productivity application and the like. A synchronization application may also be included and reside as part of the application programs 810 for interacting with a corresponding synchronization application on a host computer system (such as a server) to keep the information stored in non-volatile storage 825 synchronized with corresponding information stored at the host computer system.

System 800 has a power supply 830, which may be implemented as one or more batteries and/or an energy harvester (ambient-radiation, photovoltaic, piezoelectric, thermoelectric, electrostatic, and the like). Power supply 830 may further include an external power source, such as an AC adapter or a powered docking cradle that supplements or recharges the batteries.

System 800 may also include a radio/network interface 835 that performs the function of transmitting and receiving radio frequency communications. The radio/network interface 835 facilitates wireless connectivity between system 800 and the "outside world," via a communications carrier or service provider. Transmissions to and from the radio/network interface 835 are conducted under control of the operating system 820, which disseminates communications received by the radio/network interface 835 to application programs 810 and vice versa.

The radio/network interface 835 allows system 800 to communicate with other computing devices, including server computing devices and other client devices, over a network.

An audio interface 840 can be used to provide audible signals to and receive audible signals from the user. For example, the audio interface 840 can be coupled to speaker to provide audible output and a microphone to receive audible input, such as to facilitate a telephone conversation. A speaker may also be incorporated so that a user may interact with the computing device via voice commands.

System 800 may further include video interface 845 that enables an operation of an optional camera (not shown) to record still images, video stream, and the like. A camera may also be used to capture gestures used for interacting with the computing device.

Visual output can be provided via a display 855. The display 855 may be a touch screen display. In some cases, the display may not be touch screen and user input elements, such as buttons, keys, roller wheel, and the like are used to select items displayed as part of a graphical user interface on the display 855.

A keypad 860 can also be included for user input. The keypad 860 may be a physical keypad or a soft keypad generated on the touch screen display 855. In some embodiments, the display and the keypad are combined. In some embodiments two or more input/output (I/O) components including the audio interface 840 and video interface 845 may be combined. Discrete processors may be included with the I/O components or processing functionality may be built-in to the processor 805.

The display 855 may present graphical user interface ("GUI") elements, a predictive contextual toolbar user interface, text, images, video, notifications, virtual buttons, virtual keyboards, messaging data, Internet content, device status, time, date, calendar data, preferences, map information, location information, and any other information that is capable of being presented in a visual form. In some embodiments, the display 855 is a liquid crystal display ("LCD") utilizing any active or passive matrix technology and any backlighting technology (if used). In some embodiments, the display 855 is an organic light emitting diode ("OLED") display. Of course, other display types are contemplated.

A touchscreen (which may be associated with the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

In some embodiments, the touchscreen is a single-touch touchscreen. In other embodiments, the touchscreen is a multi-touch touchscreen. In some embodiments, the touchscreen is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen. As such, a developer may create gestures that are specific to a particular application program.

In some embodiments, the touchscreen supports a tap gesture in which a user taps the touchscreen once on an item presented on the display. The tap gesture may be used for various reasons including, but not limited to, opening or launching whatever the user taps. In some embodiments, the touchscreen supports a double tap gesture in which a user taps the touchscreen twice on an item presented on the display. The double tap gesture may be used for various reasons including, but not limited to, zooming in or zooming out in stages, and selecting a word of text. In some embodiments, the touchscreen supports a tap and hold gesture in which a user taps the touchscreen and maintains contact for at least a pre-defined time. The tap and hold gesture may be used for various reasons including, but not limited to, opening a context-specific menu.

In some embodiments, the touchscreen supports a pan gesture in which a user places a finger on the touchscreen and maintains contact with the touchscreen while moving the finger on the touchscreen. The pan gesture may be used for various reasons including, but not limited to, moving through screens, images, or menus at a controlled rate. Multiple finger pan gestures are also contemplated. In some embodiments, the touchscreen supports a flick gesture in which a user swipes a finger in the direction the user wants the screen to move. The flick gesture may be used for various reasons including, but not limited to, scrolling horizontally or vertically through menus or pages. In some embodiments, the touchscreen supports a pinch and stretch gesture in which a user makes a pinching motion with two fingers (e.g., thumb and forefinger) on the touchscreen or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes, a nose, chin, or objects such as styluses may be used to interact with the touchscreen. As such, the above gestures should be understood as being illustrative and should not be construed as being limiting in any way.

It should be understood that any mobile or desktop computing device implementing system 800 may have more or fewer features or functionality than described and is not limited to the configurations described herein.

For example, in some embodiments, user interfaces and information of various types may be displayed and interacted with on a wall surface onto which user interfaces and information of various types are projected.

In various implementations, data/information stored via the system 800 may include data caches stored locally on the device or the data may be stored on any number of storage media that may be accessed by the device via the radio/network interface 835 or via a wired connection between the device and a separate computing device associated with the device, for example, a server computer in a distributed computing network, such as the Internet. As should be appreciated such data/information may be accessed through the device via the radio interface 835 or a distributed computing network. Similarly, such data/information may be readily transferred between computing devices for storage and use according to well-known data/information transfer and storage means, including electronic mail and collaborative data/information sharing systems.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Computer-readable instructions, data structures, program modules, or other data can be embodied as a modulated data signal in, for example, a wireless medium such as a carrier wave or similar mechanism such as employed as part of a spread spectrum technique. The term "modulated data signal" refers to a signal that has one or more of its characteristics changed or set in a manner as to encode information in the signal. The modulation may be analog, digital or a mixed modulation technique. Communication media, particularly carrier waves and other propagating signals that may contain data usable by a computer system, are not included as computer-readable storage media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" do not consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method comprising:
   receiving a request to create an address for a comment in a document from a first source;
   in response to receiving the request to create the address for the comment, storing a copy of the comment at a first address and communicating the first address to the first source;
   receiving a request for content at the first address from a subscriber source;
   communicating the comment to the subscriber source;
   receiving a modification to the comment;
   storing the comment and the modification at the first address; and
   communicating the modification to the subscriber source.

2. The method of claim 1, wherein the document is a post, a message, a docx file, a pdf file, or an ePUB file.

3. The method of claim 1, wherein the subscriber source is a client.

4. The method of claim 1, wherein the subscriber source is a server.

5. The method of claim 1, further comprising sending a notice of the comment to the subscriber source.

6. The method of claim 1, further comprising:
   receiving the comment via a comment application programming interface.

7. A system comprising:
   a processor;
   one or more storage media; and
   instructions stored on the one or more storage media that, when executed by the processor, direct the processor to:
   in response to a request to create an address for a comment in a document from a first source, store a copy of the comment at a first address and communicate the first address to the first source;
   receive a request for content at the first address from a subscriber source;
   communicate the comment to the subscriber source;
   receive a modification to the comment;
   store the comment and the modification at the first address; and
   communicate the modification to the subscriber source.

8. The system of claim 7, wherein the document is a post, a message, a docx file, a pdf file, or an ePUB file.

9. The system of claim 7, wherein the subscriber source is a client.

10. The system of claim 7, wherein the subscriber source is a server.

11. The system of claim 7, wherein the instructions further direct the processor to: send a notice of the comment to the subscriber source.

12. The system of claim 7, wherein the instructions further direct the processor to:
    provide a comment application programming interface; and
    receive the comment via a comment application programming interface.

13. The system of claim 7, wherein the comment communicated to the subscriber source further comprises a history data associated therewith.

14. One or more storage media comprising instructions stored thereon that when executed by a processor, direct the processor to:
    in response to a request to create an address for a comment in a document from a first source, store a copy of the comment at a first address and communicate the first address to the first source;
    receive a request for content at the first address from a subscriber source;
    communicate the comment to the subscriber source;
    receive a modification to the comment;
    store the comment and the modification at the first address; and
    communicate the modification to the subscriber source.

15. The media of claim 14, wherein the document is a post, a message, a docx file, a pdf file, or an ePUB file.

16. The media of claim 14, wherein the subscriber source is a client.

17. The media of claim 14, wherein the subscriber source is a server.

18. The media of claim 14, wherein the instructions further direct the processor to: send a notice of the comment to the subscriber source.

19. The media of claim 14, wherein the instructions further direct the processor to:
    provide a comment application programming interface; and
    receive the comment via a comment application programming interface.

20. The media of claim 14, wherein the comment communicated to the subscriber source further comprises a history data associated therewith.

* * * * *